US009103743B2

(12) United States Patent
Couch

(10) Patent No.: US 9,103,743 B2
(45) Date of Patent: *Aug. 11, 2015

(54) COMPUTER-ASSISTED AND/OR ENABLED SYSTEMS, METHODS, TECHNIQUES, SERVICES AND USER INTERFACES FOR CONDUCTING MOTOR VEHICLE AND OTHER INSPECTIONS

(75) Inventor: William Henry Couch, Nashville, TN (US)

(73) Assignee: MANHEIM INVESTMENTS, INC., Las Vegas, NV (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/550,180

(22) Filed: Jul. 16, 2012

(65) Prior Publication Data

US 2013/0047111 A1 Feb. 21, 2013

Related U.S. Application Data

(63) Continuation of application No. 11/421,320, filed on May 31, 2006, now Pat. No. 8,230,362.

(51) Int. Cl.
*G06F 3/00* (2006.01)
*G01M 17/00* (2006.01)
*G01M 13/00* (2006.01)
*G01M 15/00* (2006.01)

(52) U.S. Cl.
CPC .............. *G01M 17/00* (2013.01); *G01M 13/00* (2013.01); *G01M 15/00* (2013.01)

(58) Field of Classification Search
CPC ... G01C 21/26; G01C 21/3647; G01C 21/365
See application file for complete search history.

(56) References Cited

U.S. PATENT DOCUMENTS

| | | | |
|---|---|---|---|
| 4,899,292 A | 2/1990 | Montagna et al. |
| 5,272,769 A | 12/1993 | Strnatka et al. |
| 5,317,503 A | 5/1994 | Inoue |
| 5,442,549 A | 8/1995 | Larson |
| 5,758,300 A | 5/1998 | Abe |
| 5,884,202 A | 3/1999 | Arjomand |
| 6,052,631 A | 4/2000 | Busch et al. |
| 6,094,609 A | 7/2000 | Arjomand |
| 6,185,540 B1 | 2/2001 | Schreitmueller et al. |

(Continued)

FOREIGN PATENT DOCUMENTS

JP 2003-58653 A 2/2003

OTHER PUBLICATIONS

Brulle et al.,; On-Board Diagnostics II (OBDII) and Light-Duty Vehicle Emission Related Inspection and Maintenance (I/M) Programs; Apr. 2004; OBD II and LDV I/M Programs; 92 pages.*

(Continued)

*Primary Examiner* — Linh K Pham
(74) *Attorney, Agent, or Firm* — Nixon & Vanderhye P.C.

(57) ABSTRACT

A computer-assisted inspection system including an integrated software suite provides vehicle inspection services for various clients. Features include automatic grading, flat car part picking, easy to use, ability to run in an environment where the inspector has no constant connectivity to the network (no guaranteed access to the internet, full data replication, intermittent connectivity, synch back up), inspectors can be geographically separated (e.g., all over the country), and the system is installable over the internet to provide efficient installation to far-flung install sites.

3 Claims, 28 Drawing Sheets

(56) References Cited

U.S. PATENT DOCUMENTS

| | | | |
|---|---|---|---|
| 6,397,131 | B1 | 5/2002 | Busch et al. |
| 6,470,303 | B2 | 10/2002 | Kidd et al. |
| 6,529,808 | B1* | 3/2003 | Diem .......................... 701/31.5 |
| 6,732,031 | B1 | 5/2004 | Lightner et al. |
| 6,775,602 | B2 | 8/2004 | Gordon et al. |
| 6,836,708 | B2 | 12/2004 | Tripathi |
| 6,885,981 | B2 | 4/2005 | Bomar et al. |
| 6,917,595 | B2 | 7/2005 | Chang et al. |
| 6,941,203 | B2 | 9/2005 | Chen |
| 6,965,324 | B1 | 11/2005 | Suggs, Sr. |
| 7,020,580 | B2 | 3/2006 | Peters et al. |
| 7,124,058 | B2 | 10/2006 | Namaky et al. |
| 7,197,444 | B2 | 3/2007 | Bomar et al. |
| 7,209,817 | B2 | 4/2007 | Abdel-Malek et al. |
| 7,228,298 | B1 | 6/2007 | Raines |
| 7,359,821 | B1 | 4/2008 | Smith et al. |
| 7,469,171 | B2 | 12/2008 | Tefft et al. |
| 7,693,896 | B1 | 4/2010 | Raines |
| 2002/0013685 | A1 | 1/2002 | Kidd et al. |
| 2003/0130966 | A1 | 7/2003 | Thompson et al. |
| 2003/0200151 | A1 | 10/2003 | Ellenson et al. |
| 2004/0015278 | A1 | 1/2004 | Gordon et al. |
| 2004/0073434 | A1 | 4/2004 | Volquardsen et al. |
| 2004/0111301 | A1 | 6/2004 | Wahlbin et al. |
| 2004/0117081 | A1 | 6/2004 | Mori |
| 2004/0117131 | A1* | 6/2004 | Peters et al. .................... 702/34 |
| 2004/0227523 | A1 | 11/2004 | Namaky |
| 2004/0243423 | A1 | 12/2004 | Rix et al. |
| 2005/0043868 | A1 | 2/2005 | Mitcham |
| 2005/0060179 | A1 | 3/2005 | Tinberg et al. |
| 2005/0108112 | A1 | 5/2005 | Ellenson et al. |
| 2005/0182535 | A1* | 8/2005 | Huang ............................ 701/29 |
| 2005/0182537 | A1 | 8/2005 | Tefft et al. |
| 2005/0267707 | A1* | 12/2005 | Mian et al. .................... 702/122 |
| 2005/0283285 | A1 | 12/2005 | Ying |
| 2006/0031041 | A1 | 2/2006 | Afshar et al. |
| 2006/0061464 | A1 | 3/2006 | Okada et al. |
| 2006/0064393 | A1 | 3/2006 | Orr |
| 2006/0074790 | A1 | 4/2006 | Anspach |
| 2006/0114531 | A1 | 6/2006 | Webb et al. |
| 2006/0132291 | A1 | 6/2006 | Dourney et al. |
| 2006/0182055 | A1 | 8/2006 | Coffee et al. |
| 2006/0255968 | A1 | 11/2006 | Woo et al. |
| 2007/0016483 | A1* | 1/2007 | Chenn ............................. 705/26 |
| 2007/0055420 | A1 | 3/2007 | Krzystofczyk et al. |
| 2007/0067075 | A1 | 3/2007 | McMillan et al. |
| 2007/0156311 | A1 | 7/2007 | Elcock et al. |
| 2007/0250232 | A1 | 10/2007 | Dourney et al. |
| 2008/0082221 | A1 | 4/2008 | Nagy |
| 2008/0154671 | A1 | 6/2008 | Delk |
| 2008/0281658 | A1 | 11/2008 | Siessman |

OTHER PUBLICATIONS

Buildfolio Real Estate/Construction Mobile Inspection Station, "The Buildfolio Solution," website information http://web.archive.org (Jan. 16, 2004).

FedBizOpps, Section: Special Notice, Notice of GSA's intent to enter into a sole source licensing agreement with Auto Auction Services Corp. (Aug. 16, 2007).

Mitchell Repair Mate, screen shots (undated).

NYVIP Vehicle Inspection System Operators Manual; Yoyodyne, Inc; http://www.nyvip.us/pdf/NY-VIP_Operators_Manual_2_2_Final06.pdf (Nov. 19, 2004).

On-Board Diagnostics II (OBDII) and Light-Duty Vehicle Emission Related Inspection and Maintenance (I/M) Programs; D. Cope Enterprises; http://www.ccme.ca/assets/pdf/jia_trnsprt_obd_e.pdf (Apr. 2002).

Pen Computer Solutions, Inc. Mobile Data Collection, PDS Software Programming and Development, Palm and Pocket PC Custom Software Programming and Development Services, Windows Mobile and Handheld/Smartpone Developers and Programmers, Sample Customized Palm OS Application for Vehicle Inspection, Pen Computer Solutions, Inc., Las Vegas, NV, 6 pages (2005).

Polk & Associates LLC, "Pre-purchase Inspections," website information, 3 pages (2003).

SubPrime Auto Finance News, "AutoIMS Introduces Latest Version of Condition Report Writing Tool," Atlanta, GA (Jun. 7, 2007).

Vale Guidelines, Sheet Metal Repairs, 1 page (undated).

Vale Training Solutions, Inc., http://www.valetrainingsolutions.com/AboutUs.aspx (undated).

Vehicle Remarketing Magazine, "AutoIMS Leverages Collective Intelligence in Latest Version of Condition Report Writing Tool," Atlanta, GA (Apr. 25, 2007).

Ashley, Charles, "Insurers Ought to be in Still Pictures," Best's Review/Life-Health Insurance, vol. 95, Issue 6, 2 pages (Oct. 1994).

Beltran, John L., "Auto Appraisals, Shifting into High Gear," Best's Review, pp. 49-52 (1992).

Burroughs, John, "How to Fix Those Dents in Your Car," Popular Science, pp. 138-141 (Mar. 1967).

Dickson, Paul et al., "Mosaic Generation for Under Vehicle Inspection," Proceedings of the Sixth IEEEE Workshop on Applications of Compute Vision (WACV '02), pp. 251-256 (2002).

Duffy, James E. et al., Auto Body Repair Technology, 4th Edition, Thomson Delmar Learning, Chapter 10 "Estimating Repair Costs" and Chapter 11 "Working Sheet Metal," pp. 262-287 and 307 (2004).

Fried, Jason, "Henrik Fisker: A Three-Part Interview with a Master Car Designer" (Apr. 19, 2007).

Gardner, Andrew, "Henrik Fisker on Aston Martin, Ford, and General Automotive Design: Part 1" (Jan. 15, 2005).

Gramopadhye, A. et al., "The Use of Advance Technology for Visual inspection Training," Applied Ergonomics, vol. 29, No. 5, pp. 361-375 (Oct. 1998).

Greene, Richard, "Appraisal Product Piloted, Ready for Nationwide Rollout," Auto Remarketing Newsmagazine, Auto Remarketing.com, 3 pages (Apr. 28, 2006).

Halberstam, David, "An American Romance," Popular Mechanics, pp. 49, 50, 52, 54, 56 (May 1989).

May, Andrew et al., "Opportunities and Challenges for Location Aware Computing in the Construction Industry," Mobile HCI '05 pp. 255-258 (Sep. 2002).

Meredith, Mike, Paintless Dent Repair, "Skilled Technicians Remove Dents without Repainting," MSN Autos (2012).

Smailagic, Asim et al., "User-Centered Interdisciplinary Design of Wearable Computers," Mobile Computing and Communications Review, vol. 3, No. 3, pp. 43-52 (Jul. 1999).

Tolinski, Michael, "Hands-Off Inspection," Manufacturing Engineering, pp. 117-130 (2005).

Vora, Jeenal et al., "Using Virtual Reality Technology for Aircraft Visual Inspection Training: Presence and Comparison Studies," Applied Ergonomics, vol. 33, pp. 559-570 (2002).

International Search Report and Written Opinion, International Application No. PCT/US07/12834, Jul. 3, 2008.

Official Action dated Jan. 31, 2013, issued in related Canadian Patent Application No. 2,652,972.

Official Action dated Oct. 25, 2013, issued in related Canadian Patent Application No. 2,652,972.

Official Action dated Aug. 14, 2014, issued in related Canadian Patent Application No. 2,652,972.

* cited by examiner

Vehicle Condition Report
Inspection Date: 2/14/2003
Control Number: 200302100001

VEHICLE INFORMATION

| | |
|---|---|
| VIN: SALPV1111XA111111 | Year: 1999 |
| Make: Range Rover | Model: 4.6hse 4x4 |
| Exterior Color: Silver | |
| Paint Type: | |
| Interior Color/Type: Black, Leather | |
| Engine Cylinders: 8 | Engine Type: Gas |
| Body: 4 Door SUV | Engine Liter: 4.6 |
| Radio: Compact Disc Player | Premium Radio: |
| Wheel Type: Aluminum | |
| Transmision: Automatic with Overdrive | |
| Odomoter Type: ODTPC 6 - Digital | Mileage: 56117 |

INSPECTION INFORMATION

Inspector: barmour
Inspector Type: ASSIGNMENT
Tag Number: none                                           Tag State: CA

CONVENIENCE AND EQUIPMENT OPTIONS

| | | | | |
|---|---|---|---|---|
| Power Antenna | ✓ Power Trunk Lift Gate | ✓ Power Door Locks | ✓ Power Windows | ✓ Power Mirrors |
| Power Passenger Seat | ✓ Power Seat | | | |
| ✓ AC | Bed Liner | ✓ Cruise Control | Fog Lamps | Heated Mirror |
| Radar Detector | ✓ Security System | Special Wheel Covers | Telescopic Steering Wheel | Trip Computer |
| Wheel Locks | After Market Rim | Bug Deflector | Drivers Air Bag | ✓ Four Wheel Drive |
| ✓ Heated Seats | ✓ Rear Defogger | ✓ Tilt Steering Wheel | ✓ Trip Counter | Special Wheels |
| Air Scoop | Camper Shell | Dual AC | Gold Package | Video Player |
| ✓ Keyless Entry | ✓ Rear Wiper | Skid Plate | Spoiler | ✓ Tinted Windows |
| Two Wheel Drive | Auto Level Suspension | Cell Phone | ✓ Dual Air Bag | Grille Guard |
| Light Bar | Roll Bar | Sliding Rear Glass | Step Bumper | Traction Control |
| VCR | Auxiliary Fuel Tank | Chrome Bed Rails | Fifth Wheel | Ground Effects |
| ✓ Luggage Rack | Running Boards | Special Paint & Trim | Sunroof Wind Deflector | ✓ Trailering Package |

EXTERIOR/INTERIOR DAMAGE LIST

| System/Component | Damage Type | Severity | Location |
|---|---|---|---|
| ABS Light: | Illuminated | Check and Advise | Interior |

FIG. 1C

| | | | |
|---|---|---|---|
| Coolant: | Low Level | Check and Advise | Exterior |
| Glove Box Door: | Mis-aligned | Other Severity | Interior |
| Front Bumper Cover: | Scuffed | Colorsand | Front |
| Mirror Outside Right: | Scratched | 2" to 3" | Front-right |

TIRES

| | Section Width | Aspect Ratio | Type | Rim Diameter | Tread Depth | Manufacturer |
|---|---|---|---|---|---|---|
| *Example:* | 225 | 50 | R | 16 | 8/32 | Goodyear |
| Left Front: | 225 | 70 | R | 16 | 5/32 | Cooper |
| Right Front: | 225 | 70 | R | 16 | 5/32 | Cooper |
| Left Rear: | 225 | 70 | R | 16 | 5/32 | Cooper |
| Right Rear: | 225 | 70 | R | 16 | 5/32 | Cooper |
| Spare: | 255 | 65 | R | 16 | 7/32 | OTHER |

COMMENTS low coolant loose wire in main loom glove box loose abs light on drive belt cracked hoses appear to be original tire size not manuf specs Although a professional inspection performed by a trained, certified vehicle inspector can be of significant value, an inspection is not a guarantee that the vehicle is free from defects or that the inspector has identified all existing flaws. A vehicle inspection is not a safety or title inspection, a warranty, or an insurance policy. Our inspection services are provied "as is", and "with all flaws". We disclaim all warranties, express and implied, regarding our inspection services, including our inspection reports, disclaim all liability for indirect, consequential, incidental, special, and punitive damages, and limit our liability to the amount paid in connection with this inspection.

INSPECTION REPORT LINK

To display a link to your Inspection Report within your web listing, do the following:

1) Click the "Select all in Textbox" button.

[ Select All in Textbox ]

```
<!--Link provided courtesy of Inspection Solution
(http://www.inspectionsolution.com)-->
http://www.inspectionsolution.com/ConditionReport/displayCR.asp?
ctrl=200302100001&crUrldisplayCR.asp
```

2) Click the right mouse button on the highlighted text and select Copy.
3) Open your web listing in a new browser window.
4) Find the area in which you want to paste the link.
5) Click Edit, Paste

PICTURES

FIG. 1D

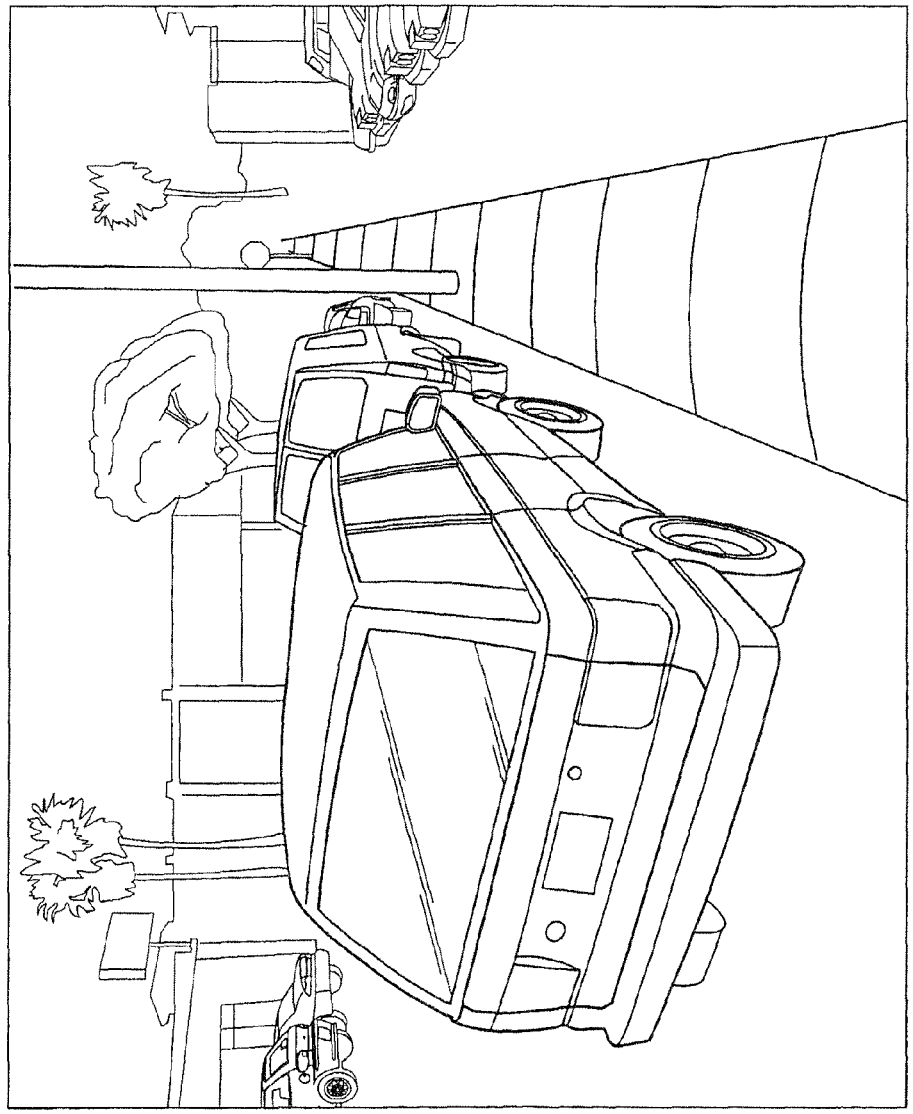

*Tablet Computer*

FIG. 3C

```
<map name="4DSN_EXT">
<area shape="poly" coords="90,21,105,21,122,26,117,95,62,95,58,26,76,21" href="Hood|005000" title=""/>
<area shape="poly" coords="58,26,46,27,38,30,34,43,41,47,47,53,49,62,49,76,46,84,40,91,34,95,30,95,30,98,62,95" href="Left_Front_Fender|011000" title=""/>
<area shape="poly" coords="141,29,122,26,117,95,150,98,150,95,145,95,140,92,133,84,130,74,130,62,132,55,135,50,140,46,145,43" href="Right_Front_Fender|031000" title=""/>
<area shape="poly" coords="146,50,140,54,136,61,135,64,135,76,138,82,144,88,147,89,154,89,157,87,162,81,164,74,164,65,162,58,159,54,153,50" href="Right_Front_Wheel|032000" title=""/>
<area shape="poly" coords="39,55,41,55,39,55,34,50,26,50,21,53,17,59,15,64,15,76,19,83,25,89,33,89,37,87,41,83,44,75,44,62" href="Left_Front_Wheel|012000" title=""/>
<area shape="poly" coords="150,98,118,95,117,97,117,157,150,157" href="Right_Front_Door|033000" title=""/>
<area shape="poly" coords="62,95,30,98,29,99,29,157,62,157" href="Left_Front_Door|013000" title=""/>
<area shape="poly" coords="62,157,29,157,29,204,37,204,44,209,50,219,51,220,62,223" href="Left_Rear_Door|016000" title=""/>
<area shape="poly" coords="150,157,117,157,117,223,121,223,130,219,134,211,137,208,143,204,150,204" href="Right_Rear_Door|036000" title=""/>
<area shape="poly" coords="103,119,117,95,62,95,77,119" href="Windshield|001000" title=""/>
<area shape="poly" coords="62,95,76,118,76,157,62,157" href="Left_Front_Glass|014001" title=""/>
<area shape="poly" coords="117,157,103,157,103,119,117,95" href="Right_Front_Glass|034001" title=""/>
<area shape="poly" coords="103,119,103,207,76,207,76,119" href="Roof|006000" title=""/>
<area shape="poly" coords="117,157,103,157,103,207,117,223" href="Right_Rear_Glass|037001" title=""/>
<area shape="poly" coords="76,157,62,157,62,223,76,207" href="Left_Rear_Glass|017001" title=""/>
<area shape="poly" coords="103,207,117,223,63,223,76,207" href="Rear_Glass|023000" title=""/>
<area shape="poly" coords="117,223,117,292,104,294,73,294,62,292,62,223" href="Trunk_Lid|022000" title=""/>
<area shape="poly" coords="62,223,50,220,51,225,51,237,48,246,43,252,37,256,35,257,30,257,30,282,62,292" href="Left_Rear_Qtr_Panel|018000" title=""/>
<area shape="poly" coords="117,253,117,292,149,282,149,257,142,257,137,253,132,247,128,237,128,224,130,219,121,223,117,223" href="Right_Rear_Qtr_Panel|038000" title=""/>
<area shape="poly" coords="152,211,144,211,138,216,134,224,134,237,138,245,145,250,153,250,159,245,163,236,163,223,159,216" href="Right_Rear_Wheel|039000" title=""/>
<area shape="poly" coords="34,211,27,211,20,216,16,225,16,237,20,244,27,250,35,250,40,246,45,238,45,224,41,216" href="Left_Rear_Wheel|019000" title=""/>
<area shape="poly" coords="89,294,107,294,121,292,122,299,134,296,137,290,137,287,148,283,142,295,136,300,108,308,70,308,43,300,37,295,30,282,42,286,44,295,56,299,59,291,73,294" href="Rear_Bumper|024000" title=""/>
<area shape="poly" coords="59,291,42,286,44,295,56,299" href="Left_Rear_Lights|021105" title=""/>
<area shape="poly" coords="137,286,137,290,134,296,123,299,121,291" href="Right_Rear_Lights|021101" title=""/>
<area shape="poly" coords="85,316,79,321,75,329,75,343,80,351,85,355,93,355,100,350,104,342,104,329,101,322,94,316" href="Spare_Tire|026000" title=""/>
</map>
```

FIG. 6

| Client | Part | Damage | Severity | Action | Chargeability |
|---|---|---|---|---|---|
| Chrysler | Windshield | Broken | Replacement Req. | Replace | Chargeable |
| Chrysler | Windshield | Bulls-eye | >1" | Replace | Chargeable |
| Chrysler | Windshield | Bulls-eye | <1" | Repair | Non-Chargeable |
| Chrysler | Windshield | Chipped | >1" | Replace | Chargeable |
| Chrysler | Windshield | Chipped | <1" | Repair | Non-Chargeable |
| Chrysler | Hood | Scratch | Buffable | Buff | Non-Chargeable |
| Chrysler | Hood | Scratch | <1" | Touch-Up | Non-Chargeable |
| Chrysler | Hood | Scratch | 1" – 1.99" | Touch-Up | Chargeable |
| Chrysler | Hood | Scratch | >2" | Repaint | Chargeable |
| Chrysler | Hood | Dent | <1" | PDR* | Non-Chargeable |
| Chrysler | Hood | Dent | 1" – 5.99" | Repair | Chargeable |
| Chrysler | Hood | Dent | >6" | Replace | Chargeable |

*Paintless Dent Repair

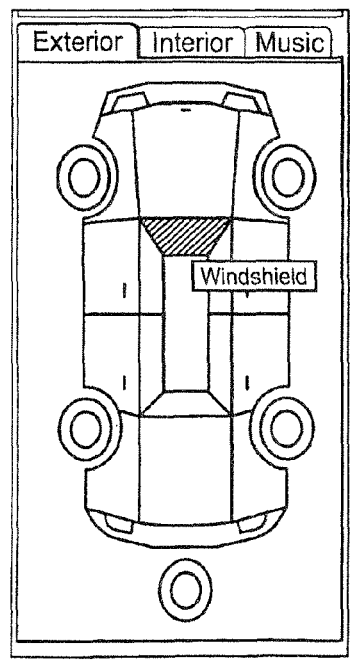

Damage Entry

- Item: Windshield
- Damage: Bullseye
- Severity:
- Action: more than 1/2 inch / 1/2 inch or less
- Charge:

|  | Hours | Dollars | Fixed Costs | Mitchell Part Cost | Final Part Cost |
|---|---|---|---|---|---|
| Repair Labor: |  |  |  |  |  |
| Refinish Labor: |  |  |  |  |  |
| Parts/Install Labor: |  |  |  |  |  |

Part Description:

Total Charges:

[ OK ]  [ Cancel ]  [ Delete ]

FIG. 11

Damage Entry

- Item: Windshield
- Damage: Bullseye
- Severity: more than 1/2 inch
- Action: Replace
- Charge: Chargeable

|  | Hours | Dollars | Fixed Costs | Mitchell Part Cost | Final Part Cost |
|---|---|---|---|---|---|
| Repair Labor: | 0.0 | 0.00 | 0.0 |  |  |
| Refinish Labor: | 0.0 | 0.00 | 0.0 |  |  |
| Parts/Install Labor: | 0.0 | 0.00 | 0.0 | 380.00 | 380.00 |

Part Description:

Total Charges: 380.00

[ OK ]  [ Cancel ]  [ Delete ]

| Condition Report Validation Results For VIN: BADVIN12345678901 | ⊠ |
|---|---|

The following issues were found during the validation of the condition report. You must click the Return to Inspection Button and correct the issues or enter the reason why you could not enter the required information.

| | |
|---|---|
| Problem: | The type of Airbag must be specified. |
| Problem: | Attachment Interior Photo - Trunk does not exist on CR |
| Reason not Entered: | This sub-model does not have a trunk |
| Problem: | Attachment Exterior Photo - Right Rear does not exist on CR |
| Problem: | Attachment Tire Photo does not exist on CR |
| Problem: | Attachment VIN Plate Photo does not exist on CR |
| Problem: | The type of Audio system must be specified. |
| Problem: | The dash type must be specified. |
| Problem: | Exterior color must be specified. |
| Problem: | For Gasoline engines the number of cylinders must be specified. |
| Problem: | For gasoline engines the size must be specified. |

[ Return to Inspection ] [ Submit Inspection With Validation overrides ]

FIG. 13B

COMPUTER-ASSISTED AND/OR ENABLED SYSTEMS, METHODS, TECHNIQUES, SERVICES AND USER INTERFACES FOR CONDUCTING MOTOR VEHICLE AND OTHER INSPECTIONS

CROSS-REFERENCES TO RELATED APPLICATIONS

This application is a continuation of U.S. application Ser. No. 11/421,320 filed May 31, 2006, which claims the benefit of Provisional Application No. 61/480,086 filed Apr. 28, 2011. The contents of each of these applications are incorporated herein by reference.

FIELD

The technology herein relates to computer systems for use in inspecting items including but not limited to motor vehicles. More specifically, the technology herein relates to portable computer device user interfaces for providing vehicle inspection services through deployment of a decentralized network of inspection data collection systems.

BACKGROUND AND SUMMARY

In modern commercial transactions, it is often desirable to examine goods or other articles carefully to ascertain their condition. New articles rolling off an assembly line are often inspected to ensure that they are saleable and do not suffer from any major defects. Inspections become especially important in the used goods market; it is often desirable to inspect such used goods to determine whether they have been damaged during use and/or to ascertain their current value.

Inspections are especially important for "high ticket" items such as used cars, boats, motorcycles, airplanes and other vehicles. A used car that has suffered damage through hard use or accident is not as valuable as one that has been only lightly used, well maintained and never subject to any collision. Used car buyers are often warned to obtain a complete inspection before purchase to minimize the risk that the used vehicle has hidden defects, flaws or other damage. Similarly, those dealing with a large used item inventory, such as motor vehicle fleet operators, need reliable damage inspections. For example, cars coming off short term or long term leases need to be inspected so the leasing agent can know whether to charge the lessee for damage the lessee is responsible for. Similar inspection needs may be presented in other contexts such as new and used home sale and rent, apartment, office building and other real estate sale and rental, industrial equipment sales, antiques, service offerings, and any type of transaction involving any type of good or service of value.

In the past, inspections were generally performed manually using preprinted forms. The inspector would work from a form or check list on a clipboard as he or she visually inspected the item. Defects would be noted on the form. Sometimes, such forms would include schematic illustrations (e.g., line drawings) of the item being inspected so the inspector could note location and type of damage. Such forms could be mailed or transmitted electronically by facsimile. Damage assessments could be made by comparing information noted on the form with standard damage assessment information. In the case of motor vehicles, for example, the inspector or other person could consult the Kelley Blue Book or other source to determine the fair market value of the vehicle based on the condition of the vehicle, the options installed and other factors.

Preprinted forms are perfectly acceptable for some types of needs and applications, but may be inconvenient or inefficient in other contexts. Suppose, for example, that an inspection service conducts inspections for a number of different clients each having different inspection standards. In the motor vehicle context, one client might want to know about every scratch on the vehicle paint, whereas another client might only care about scratches that are longer than 3". If such an inspection service conducted inspections for a large number of different clients and a large number of different kinds of motor vehicles, the number and variety of forms would soon get out of hand. If one adds additional challenges such as a large number of geographically-disparate inspectors, clients who want the ability to dynamically change their inspection requirements and/or procedures, and the need to rapidly communicate inspection reports and other results to different locales, it soon becomes apparent that using preprinted forms to collect inspection data becomes impractical.

Some in the past have attempted to use computers and computer systems to gather inspection information. Various systems and techniques have been developed. However, further improvements are possible and desirable.

Exemplary illustrative non-limiting implementations of technology described herein provide a new and useful computer-based inspection data collection system that is especially adapted for modern inspection needs and constraints. An exemplary illustrative non-limiting implementation provides for a large number of inspectors who are geographically separated from one another and may in some cases be only intermittently reachable by electronic means. Each such inspector is provided with a portable data processing appliance such as for example a tablet computer with a touch screen type display and input means. The inspector may, for example, connect the inspection appliance electronically to a main system periodically (e.g., every night and/or every morning, or more or less frequently depending on need) to upload inspection results and obtain electronic updates of inspection procedures, inspection rules (which may be client-specific), cost information and other data. Information electronically provided to the appliance can include, for example, a schedule of appointments and locations for the inspector to visit to inspect goods or services.

The exemplary illustrative non-limiting inspection appliance may provide a unique, easy-to-use touch screen user interface. For example, a schematic diagram of the item being inspected may be displayed on the touch screen. The inspector can use a stylus or other pointing device to indicate damage location on the displayed schematic diagram. Different schematic diagrams can be displayed for different types of goods. For example, in the case of motor vehicles, a different schematic illustration can be displayed depending upon on whether the vehicle being inspected is a sports utility vehicle, a passenger car, a light truck, a compact or other vehicle type.

Aspects of the user interface can be customized based on for example who the inspection is being performed for. Different clients may have different inspection needs. Some clients may not care about certain defects that other clients want to know about. The exemplary illustrative non-limiting implementation can provide, on the inspection appliance, different rules that can be activated in response to which client the inspection is being provided for and/or other factors. The resulting rule-driven user interface is thus customized—allowing the inspector to be more efficient in gathering the precise data desired at the time of data collection. If the inspection client changes the rules, such rule changes can be propagated through electronic downloads across the network of inspection appliances so that inspections can proceed based on the new rules.

Exemplary illustrative non-limiting implementations provide an integrated software suite that provides vehicle inspection services for various clients. An exemplary illustrative non-limiting implementation includes an inspection application that runs on for example desktop, laptop, or pen-tablet PC's; a centralized server application that handles data synchronization between the database and the inspection PC's; numerous systems to handle reporting and data transfer to clients; and a web front end to allow clients to view vehicle inspections on the Internet.

Additional advantageous non-limiting features and/or advantages include:
Highly client-customizability
Easy to Use
ability to run in an environment where the inspector has no constant connectivity to the network (no guaranteed access to the internet, full data replication, intermittent connectivity, synch back up)
inspectors can be geographically separated (e.g., all over the country)
by providing lease services to a number of different companies, it is possible to provide economies of scale
system is installable over the internet to provide efficient installation to far-flung install sites
responsive to inspection requests sent daily (e.g., workflow data files received on a nightly basis—info about vehicles coming off lease to be inspected)
rigorous, customized inspection techniques accommodated.
as the inspector enters the damage, the system knows which client and knows what matters to the client and guides the inspector through the process

BRIEF DESCRIPTION OF THE DRAWINGS

These and other features and advantages will be better and more completely understood by referring to the following detailed description of exemplary non-limiting illustrative implementations in conjunction with the drawings of which:

FIGS. 1C, 1D, 1E, 1F, 1F-1 and 1F-2 show an example prior art condition report;

FIG. 2 shows an exemplary illustrative non-limiting block diagram of an inspection system architecture;

FIG. 3C shows an exemplary illustrative non-limiting coordinate map for a four-door sedan exterior image;

FIG. 6 show an exemplary illustrative non-limiting set of database records representing a combination of part, damage, severity, action, and (optionally) special condition that are valid for a given client;

Figures 8, 9:
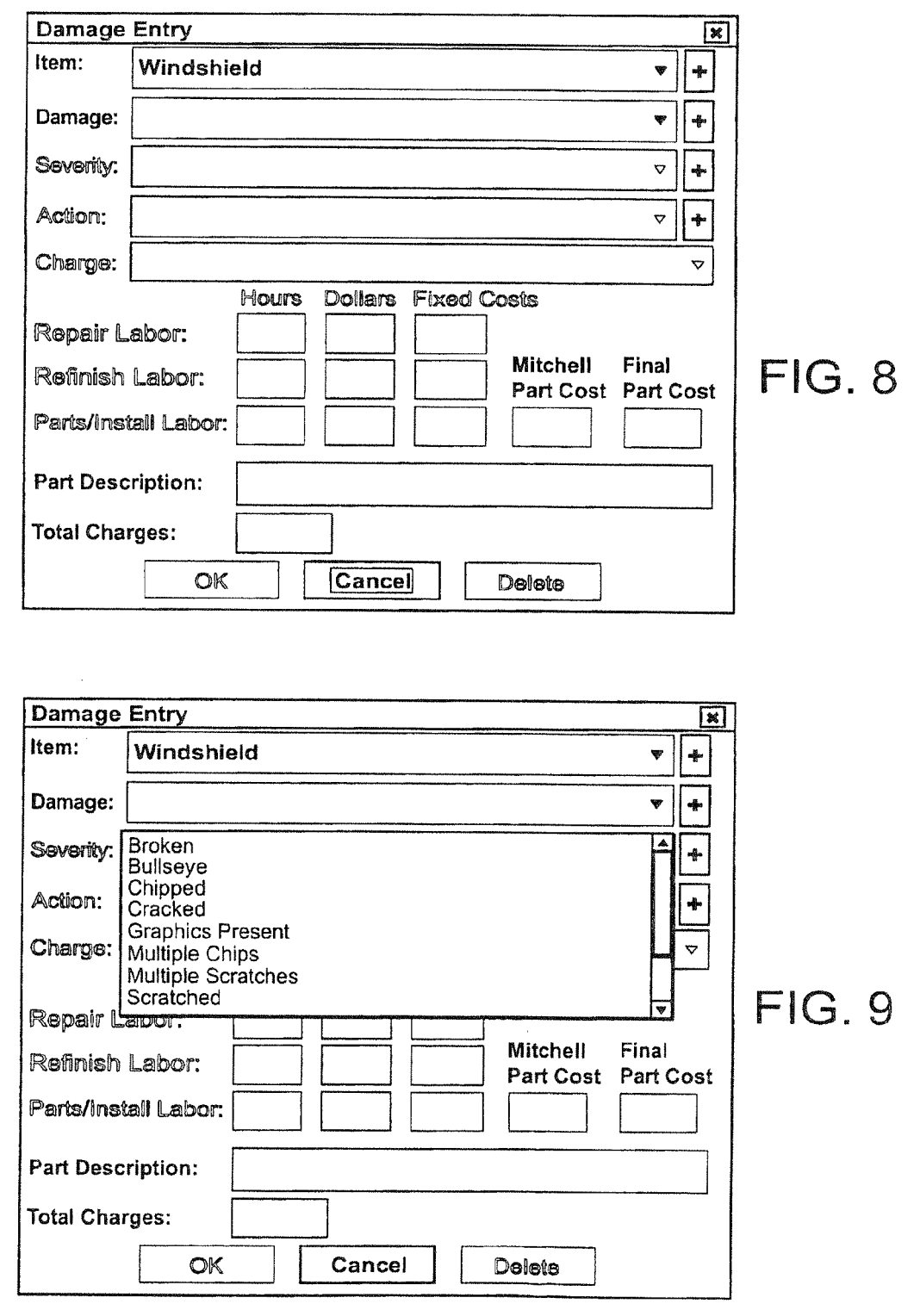

FIGS. 7, 8, 9, 10 & 11 show an exemplary illustrative non-limiting sequence of user interface screen displays for use in inputting damage or other characteristic information;

FIGS. 13A-13D show an exemplary illustrative non-limiting exception display.

DETAILED DESCRIPTION

Figure 1:
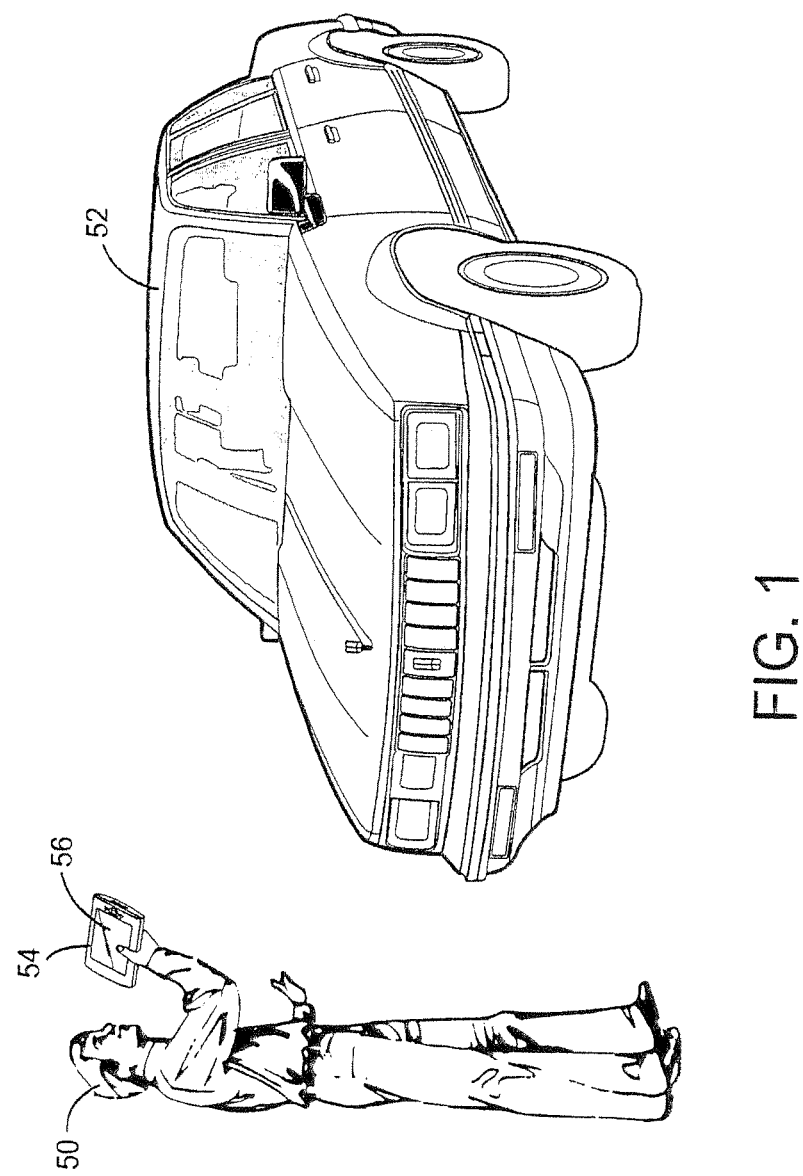
FIG. 1 shows an exemplary illustrative non-limiting motor vehicle inspection scenario.

FIG. 1 shows an example illustrative non-limiting inspection scenario. In the FIG. 1 example, an inspector 50 uses a portable computer-based inspection appliance 54 having a touch screen 56 to inspect a motor vehicle 52. The motor vehicle 52 can be a new vehicle or used motor vehicle. It can be any type of motor vehicle including for example a passenger car, a light truck, a heavy truck, construction equipment, a motorcycle, a boat or other watercraft, an airplane or other aircraft, or any other type of motor vehicle. The technology herein is not limited to motor vehicles, but can be applied to any type of good or service requiring inspection or other careful examination to isolate and detect flaws, defects, damage, features, options, or any other physical characteristics.

In the FIG. 1 example shown, a human inspector 50 is physically present at the site of the motor vehicle 52. The human inspector 50 might for example travel to where the motor vehicle 52 is or will be located, or the motor vehicle may be driven or otherwise moved to where the inspector is or will be located. The inspector 50 visually inspects the motor vehicle 52 for features and damage. Such inspection can be relatively comprehensive and include for example any or all of the following:

Exterior:
Frame or structural damage due to collision
Collision repairs that are below industry standards
Significant dents, dings, and scratches
Missing or broken components including glass and mirrors
Operation of exterior lighting
Abnormal wear and condition of tires (includes spare)
Provides documentation on tire size, brand and amount of tread remaining on each tire
Significant damage to wheels and/or hubcaps
Other
Interior
Provides documentation of all accessories
Verifies proper operation of all factory equipment
Significant damage to seats, carpets, headliner, sun visors, trim pieces, dash and console areas
Missing or broken items
Evidence of flood or water damage
Other
Chassis
Damage or wear to exhaust system, steering system, shock absorbers, struts and CV boots
Transmission, differential or power steering leaks
Evidence of frame or structural damage due to collision
Other
Engine
Significant oil or coolant leaks Condition of fluids Belts and hoses for wear or need of replacement Serious mechanical problems indicated by abnormal noises, evidence of overheating, poor running condition or exhaust smoke Missing or damaged components Other In the exemplary illustrative non-limiting implementation, inspection appliance 54 may guide human inspector 50 in conducting the inspection and/or the appliance may collect and record the inspection data by receiving inputs from the human inspector. In one exemplary illustrative non-limiting implementation, inspection appliance 54 may comprise a tablet or other computing device including a touch screen 56. Such a touch screen 56 displays information for inspector 50 to see, and also allows the inspector to input information graphically, through gestures and by other means. For example, the inspector 50 may use a stylus or a finger to actuate virtual buttons displayed on touch screen 56, draw or otherwise indicate graphical information, or perform other data input operations. The use of a touch screen based tablet computer for inspection appliance 54 is a non-limiting example—other inspection appliance configurations might include for example personal digital assistants, laptop computers, desktop computers, wearable computers, cellular telephone type devices, or any other portable or non-portable electronic device capable of receiving, processing, storing and/or presenting information.

In the exemplary illustrative non-limiting implementation, the inspection appliance 54 provides a graphical user interface (GUI) that is easy to use and guides the inspector 50 through the inspection process. This graphical user interface is, in the exemplary illustrative non-limiting implementation, customized based on who the inspection is being performed for, the purpose of the inspection, and/or other factors. For example, inspections performed for vehicles coming off long term lease may be different from inspections performed by car rental companies to determine possible damage during daily or other short term leases. Similarly, different fleet operators may have different inspection needs and requirements. Inspections performed for motor vehicles 52 that have been repossessed may have different requirements from those vehicles that are being sold for trade in. The exemplary illustrative non-limiting inspection appliance 54 may store various different inspection rules and profiles, and use them to customize the process flow, dialogues and other aspects of the displayed or otherwise presented user interface to guide inspector 50.

Once the inspector 50 is finished with an inspection, the inspection appliance 54 may validate the inputted information for internal consistency and/or compliance with rules. The inspection appliance 54 may, for example, warn the inspector that he or she has forgotten certain information or has entered it incorrectly. Such inspection validation procedures may save time (the inspector does not have to return to re-inspect the vehicle) and/or ensures more complete and accurate information.

Although not shown, the inspector 50 can use a digital camera or other imaging device to capture images of the vehicle 52 being inspected. Such a digital camera or other imaging device can be connected to (or may be an integral part of) inspection appliance 54. Inspection appliance 54 can store such captured images along with other collected inspection information.

Inspection appliance 54 may include a damage or value calculation function that automatically compares the condition of vehicle 52 with internally stored standards. For example, the inspection appliance 54 may contain a fair market "blue book", Mitchell Collision Estimating & Reference Guide and/or other valuation data as well as algorithms for discounting or enhancing valuation based upon damage, options or other characteristics. Inspection appliance 54 may generate a condition and/or value report that can be displayed on touch screen 56, transmitted to a printer or other rendering means via wireless or wired connections, or otherwise stored and/or presented.

In one exemplary illustrative non-limiting implementation, a portable inkjet or other printer may be connected to the inspection appliance 54 (and/or may be integral with it to provide a written inspection report. In other example implementations, 802.11 WIFI or other wireless or wired connectivity can be used to communicate collected inspection information from the inspection appliance 54 to other nodes or locations.

Figure 1A:
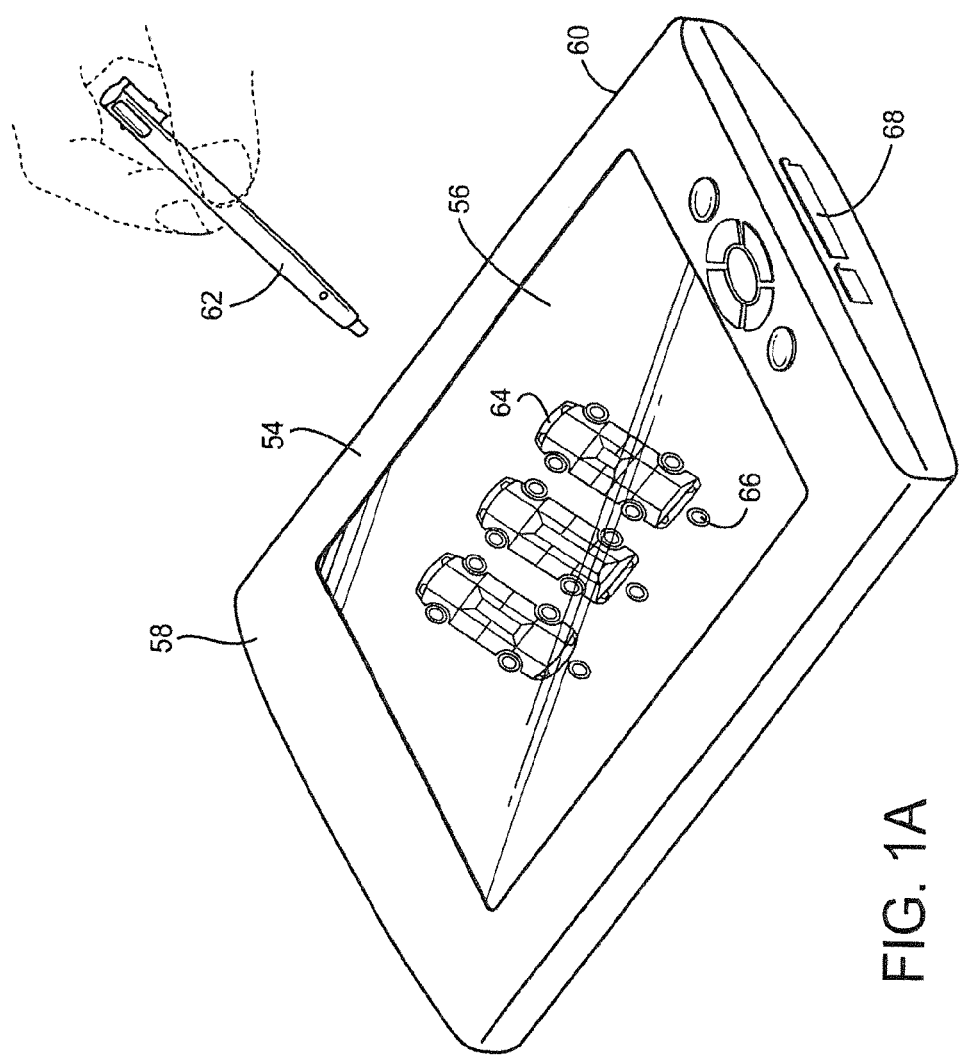
FIG. 1A shows an exemplary illustrative non-limiting touch screen based inspection appliance.

FIG. 1A shows one example illustrative non-limiting inspection appliance 54 including a touch screen 56. Inspection appliance 54 may comprise, for example, a conventional commercially available tablet computer including a handheld, portable housing 58 containing an internal battery operated power source. The internal battery power source may be replaceable and/or rechargeable. Such a handheld portable inspection appliance 54 may include, in addition, user input controls 60 such as for example, buttons, knobs, keys, keyboards, directional controls, microphones and/or other input devices. A stylus 62 can be placed in contact with the touch screen 56 to indicate positional information. The inspection appliance 54 may provide corresponding visual feedback in response to stylus 62 positioning including, for example, color changes, gesture tracing, dialogue boxes and other visual, aural and/or other feedback. In one exemplary illustrative non-limiting implementation, inspection appliance touch screen 56 may display textual information, graphical information, or a combination of textual and graphical information.

In the particular non-limiting example shown, the touch screen 56 is displaying schematic graphical line drawing type illustrations 64 of motor vehicles. The inspector 50 can select an appropriate line drawing by, for example, marking a selection bubble 66 using stylus 62, or the appropriate line drawing can be selected and automatically displayed based on vehicle identification number decoding (described below). Inspector 50 may also indicate location of dents, scratches and other damage by placing the tip of stylus 62 onto a corresponding location on the displayed schematic illustration 64. Inspection appliance 54 can provide visual and/or aural feedback, and may collect information in a variety of other ways including for example voice logging, image capture, automatic scanning or any other desired means.

The exemplary illustrative non-limiting inspection appliance 54 may include a port 68 for use in communicating information via the outside world. Port 68 may comprise a wireless adapter (such as WIFI, WLAN or any other radio or other wireless based connection), a wired connection such as a modem, Ethernet network interface card, a parallel or serial data connector, or any other means of communicating electrical or electronic signals. Port 68 in the exemplary illustrative non-limiting implementation is used to both input information to the inspection appliance 54 and to communicate information collected by the inspection appliance to the outside world.

The FIG. 1A configuration for appliance 54 is one non-limiting example—any other desired portable or non-portable computing device configuration can be used instead or in addition. Computation capabilities can be local, remote or a combination. In some configurations, appliance 54 may comprise a simple "dumb" terminal type device comprising an input means, a display means and a communication means. In other configurations, appliance 54 may comprise a complete, self-sufficient standalone computing device with internal processing, storage, communication and other capabilities.

Figure 1B:
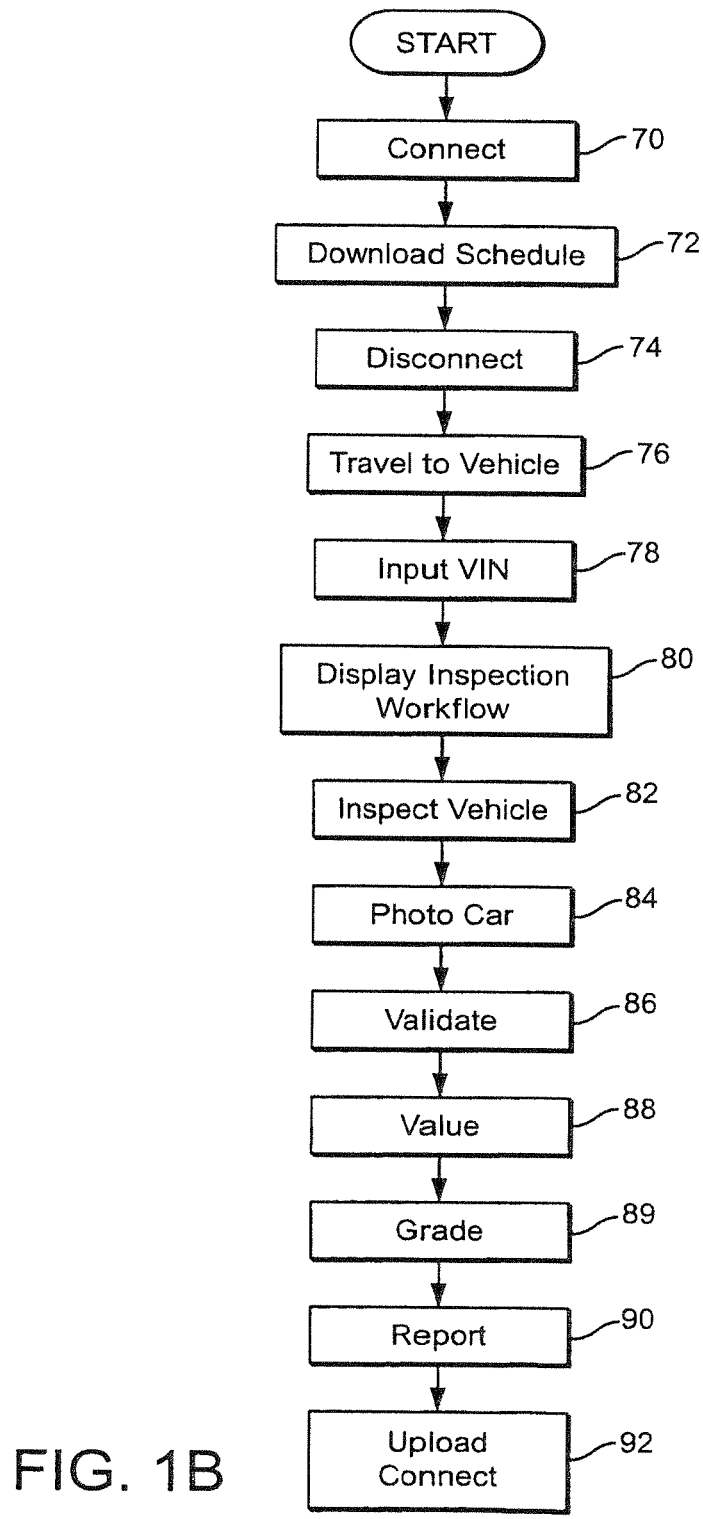
FIG. 1B is a flowchart of an exemplary illustrative non-limiting inspection process.
Figure 1E:
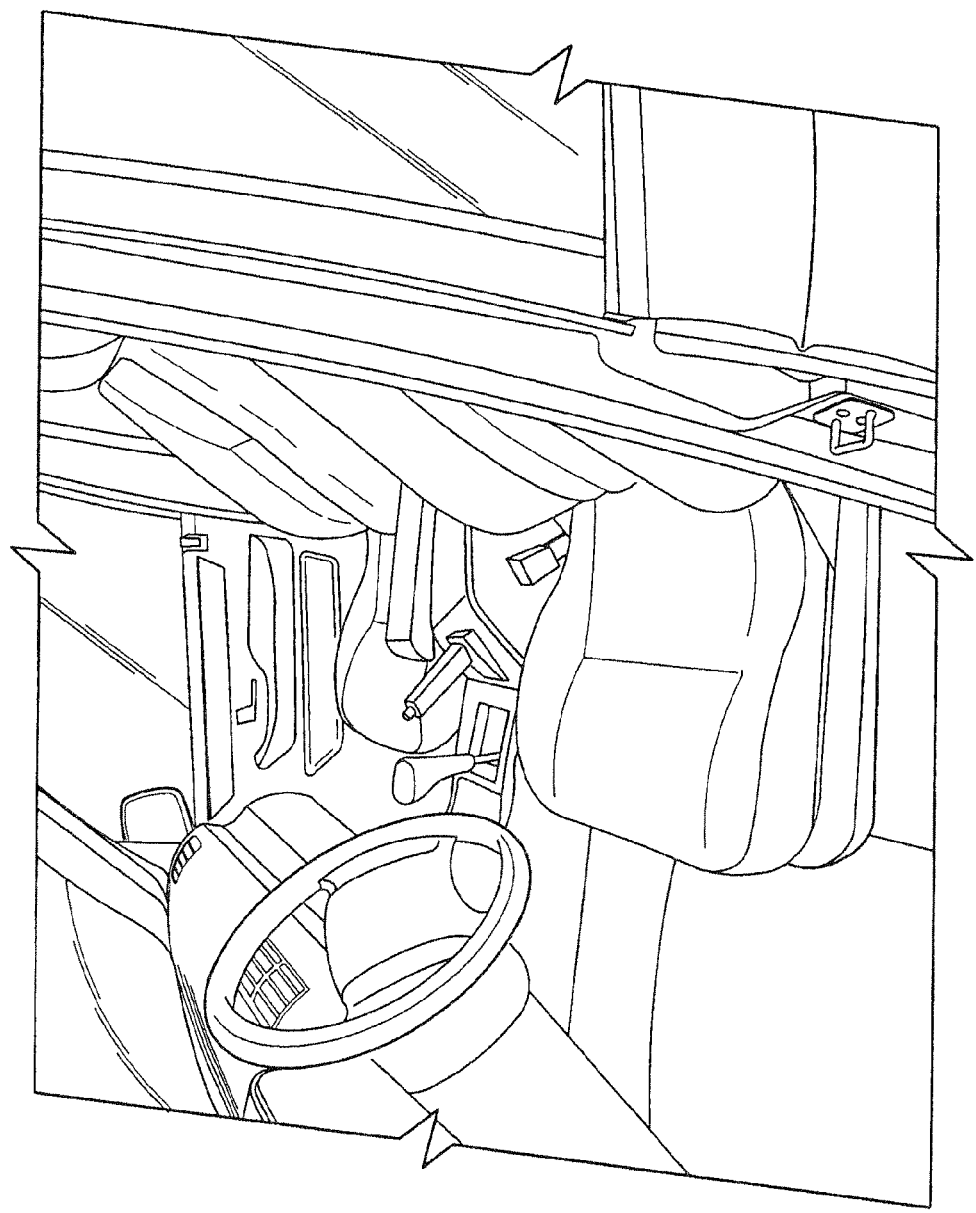
Figure 1F:
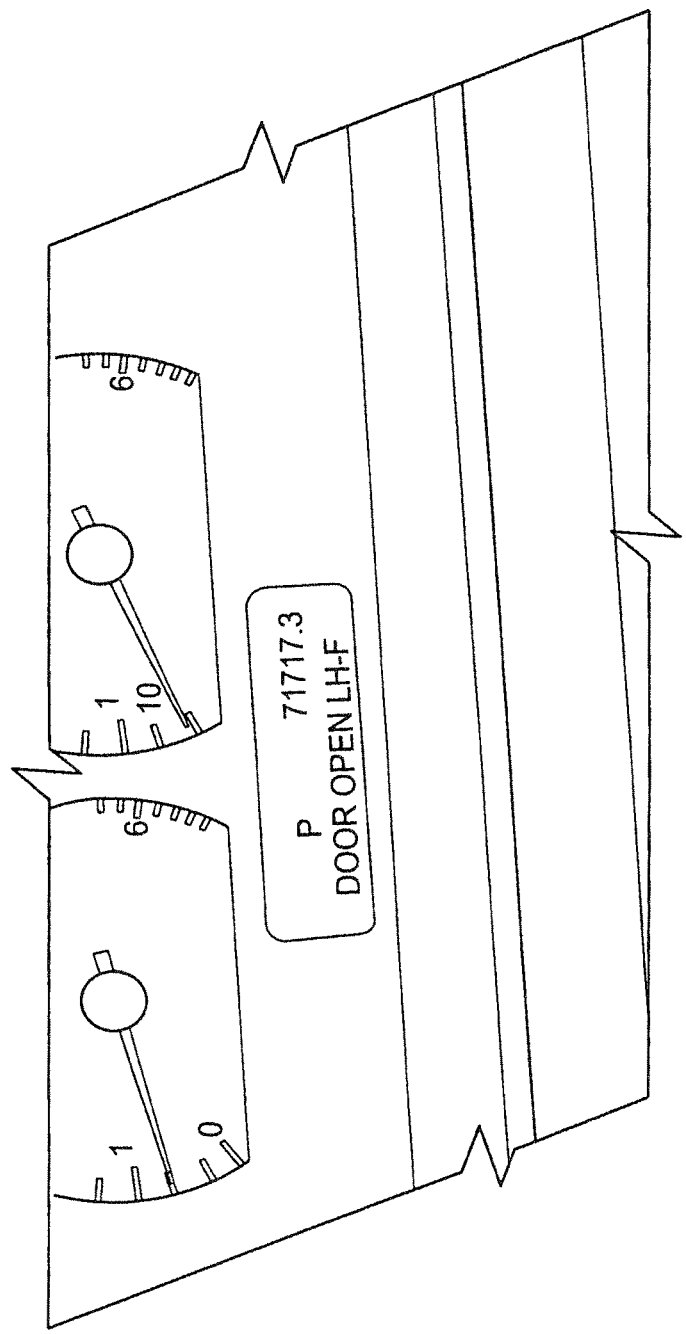

FIG. 1B is a flowchart of a example inspection process. At the beginning of a work period, human inspector 50 connects appliance 54 to a network (to be described below) to receive a download including workflow, software updates, rules updates and other information (blocks 70, 72). The workflow may include for example a schedule of cars to inspection for which client at which locations. The inspector 50 may now, in some exemplary illustrative implementations, disconnect appliance 54 from the network (block 74) and take the appliance to the site of a vehicle 52 to be inspected (block 76). At the inspection site, the inspector 50 may input the vehicle identification number (VIN) into appliance 54. Such a VIN may be input based on an "add new work" request that inspector 50 commands appliance 54 to perform—which may start a "wizard" that automatically takes the inspector through various steps including for example specifying location (e.g., can prompt for auction or vehicle location), input VIN (which will be decoded to figure out what kind vehicle, etc. The appliance 54 can decode the VIN in the exemplary illustrative non-limiting implementation to determine the type (make, model) of vehicle (e.g, SUV, passenger car, light truck, etc.). The previously downloaded workflow information also specifies which inspection client the inspection is being performed for. Based on this information (as well as potentially other information), the inspection appliance 54 automatically determines, based on previously downloaded/stored rules and a "rules engine", what inspection protocol and workflow to follow.

The inspection 50 then typically performs a relatively rigorous inspection of the vehicle 52. Such inspection can include, for example, standing at the left front fender and looking down exterior of the car at shallow angle to see dents, scratches and other defects. The inspection 50 may also, for example, walk the entire car, looking for dents and other imperfections from every angle (including the roof). This procedure allows the inspector 50 to have a general overall view of car to detect any collision or other damage. The inspector 50 typically also conducts a much more detailed inspection—for example, getting down on his hands and knees and looking for undercarriage damage, axle, wheels, etc. Each time the inspector 50 finds damage, he inputs it into the inspection appliance 54 by use of a stylus to touch the touch screen 56. As the inspector 50 walks around the car 52, he uses the stylus to touch the touch screen of appliance 54 to interact with the internal executing software and input damage information. The inspector 50 also notes options on the car and inputs this information into the appliance 54. The inspector 50 then opens the door of the vehicle, and carefully inspects the interior of the car, using appliance 50 to note all interior options, and damage (e.g., including color, cleanliness, odors, etc.).

One the visual inspection is complete, inspector 50 uses a digital camera to photograph the vehicle (block 84). Such photographs can include for example odometer, VIN plate, trunk, actual damage, and any other desired views (which photos the inspector takes can be client-specific based on what the client wants). The inspector 50 may connect the digital camera to appliance 54 and use embedded software to assign the photos to correct image locations in a draft condition report the appliance is preparing.

In the exemplary illustrative non-limiting implementation, appliance 54 may then validate the inputted information (block 86)—generating any exception warnings if the inputted inspection information is incomplete or inconsistent. The appliance 54 may also calculate a value for the inspected vehicle 52 based on stored valuation information (block 88). Appliance 54 may also assign the vehicle a "grade" (block 89) based on a rules engine—with grading rules being customized based on who the inspection is being prepared for, the type of inspection, or other factors.

The appliance 54 may generate a condition report (see FIGS. 1C-1F for an example prior art condition report) (block 90) which may be printed by an internal or external printer if desired. At that time or some later time (e.g., when the inspector 50 returns home), the inspector again connects appliance 54 to the network to upload the inspection report and other collected information (block 92). Appliance 54 keeps track of which inspection results it has not yet uploaded, and supplies those over the network in the form of a "data synch." Such uploaded condition report information can be made available over the Internet or otherwise for viewing by the client (all inspections for a particular client obtained from all inspection appliances 54 can be aggregated and organized for easy access and display). The data synch can be two-way—i.e., the appliance 54 uploads harvested inspection information and downloads new work assignments, new rule updates, and other information. In other exemplary illustrative implementations, wireless means is used to continuously connect appliance 54 to a data network so that data synchronization can be carried on periodically or continually.

Example System Architecture

Figures 1, 1F, 2:
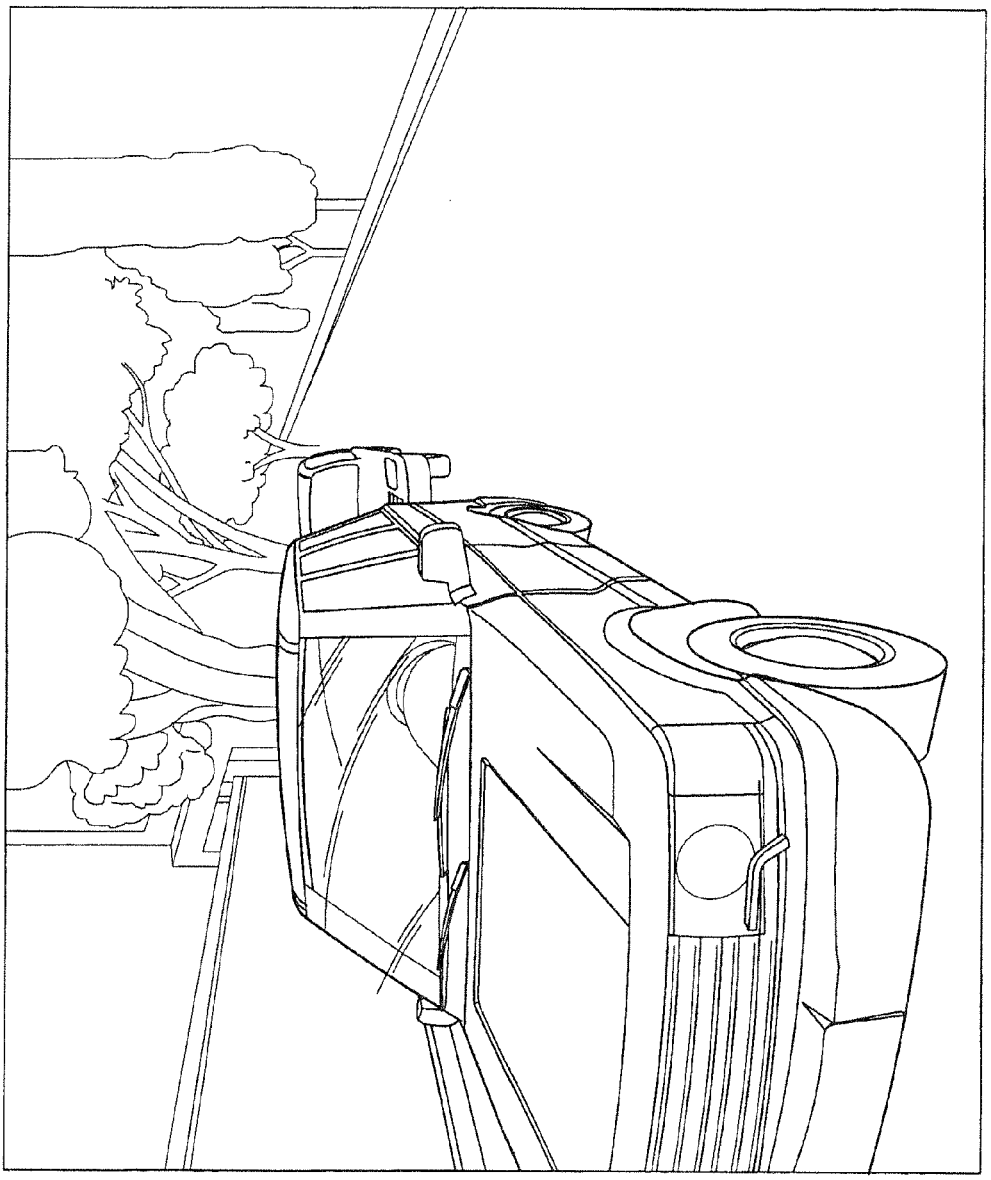

FIG. 2 shows an exemplary illustrative non-limiting overall computer system architecture 100 used to interact with inspection appliances 54. A network 102 conveys information to and from appliances 54. Network 102 can for example allow inspection appliances 54 to communicate with a computer 104 coupled to a database 106. Database 106 may store information including but not limited to client rules 106a, damage valuation data 106b, application software updates 106c, inspection schedules 106d, inspection reports 106e, and other information. Computer 104 (which may for example comprise or include a SQL, Oracle or other database server in one exemplary illustrative non-limiting implementation) downloads data from database 106 to requesting inspection appliances 54 and uploads information from the inspection appliances 54 to database 106. Computer 104 may comprise a cluster or network of computers including for example a rules-based workflow engine that handles and schedules inspection, repossession, etc. (including rework and rescheduling), determines which kind of work needs to go to a call center, and sends out workflow assignments to particular inspectors based on geographic proximity, availability and other factors. Network 102 may provide constant, periodic, occasional and/or infrequent connection between computer 104 and appliances 54 depending on need for timeliness. In one exemplary illustrative non-limiting implementation, network 102 may comprise or include a bank of modems and/or Internet routers communicating using TCP/IP or any other desired communications protocol(s), but other wireless or wired networking capabilities may be used as desired.

FIG. 2 further shows a web server 108 coupled to access database 106 (or a mirrored copy of same). Web server 108 allows remotely located web browser clients 108a, 108n to access and display or otherwise process inspection reports 106e and/or other information stored within database 106 via network 102.

Figure 2:
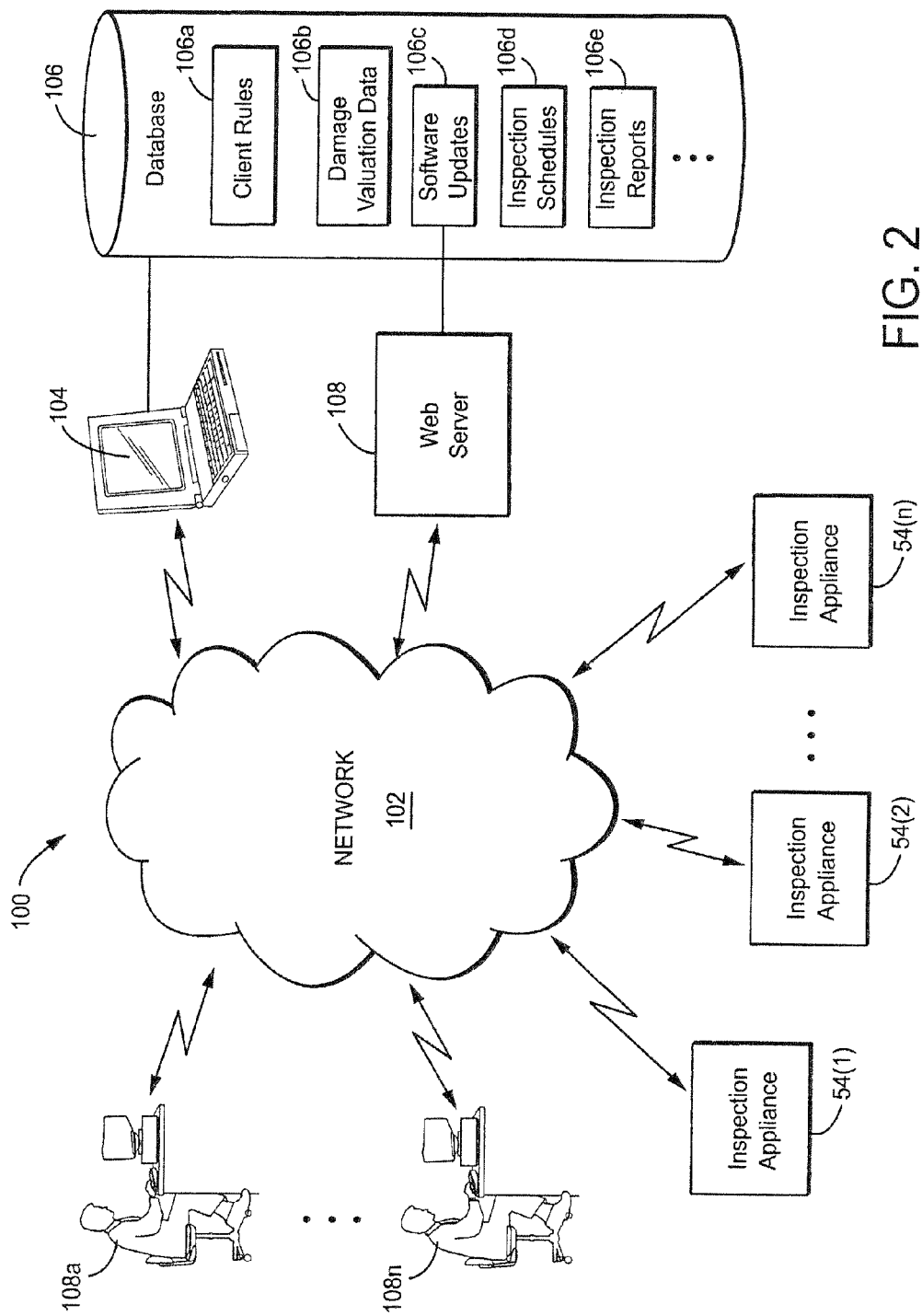
Figure 2A:
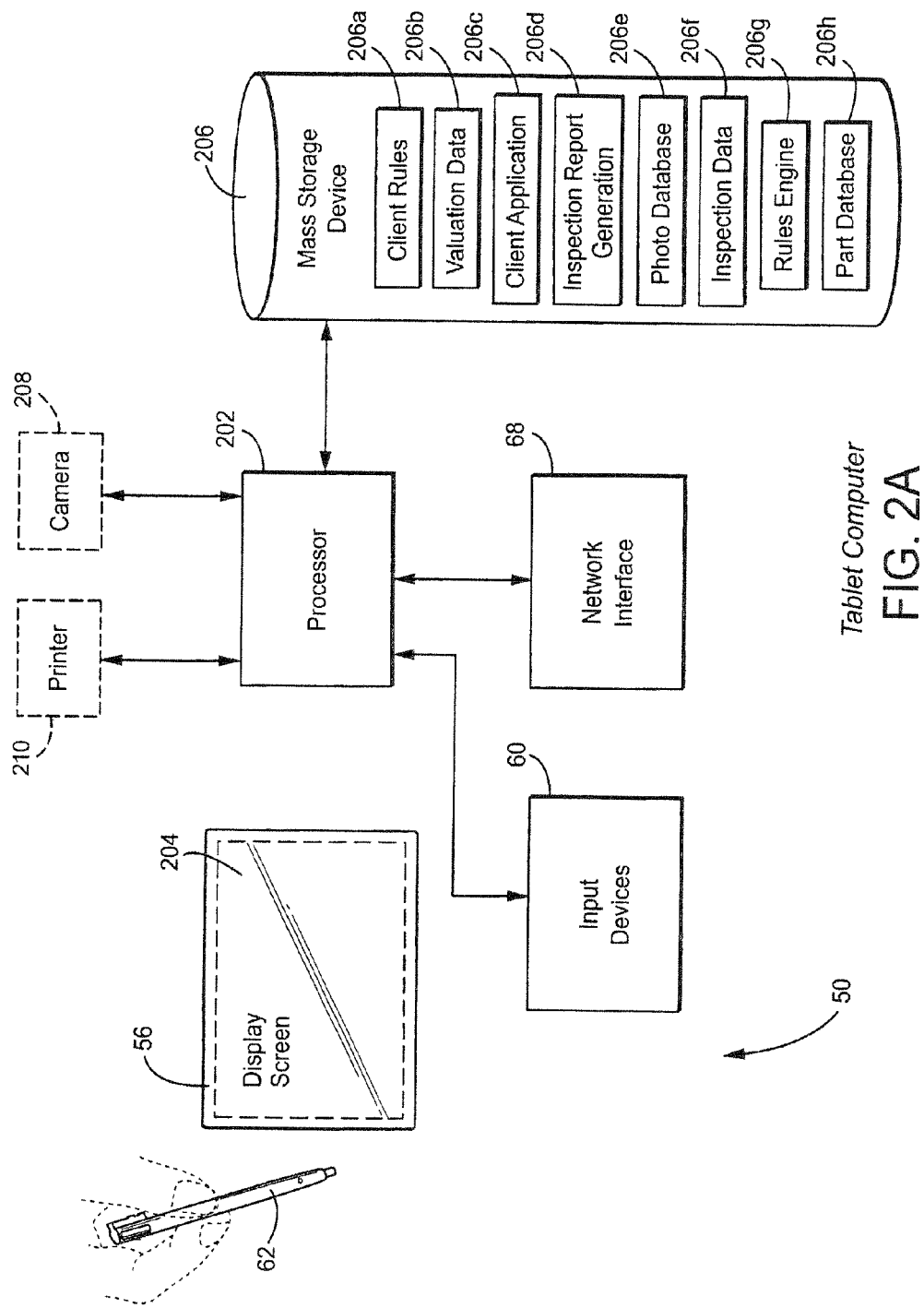
FIG. 2A shows an exemplary illustrative non-limiting block diagram of an inspection appliance.

FIG. 2A shows an exemplary illustrative non-limiting architecture for inspection appliance 54. A processor 202 may be used to control display screen 56 and receive inputs from a touch-sensitive portion 204 of the screen. Processor 202 may also receive input from input devices 60 and/or network interface 68. Processor 202 may also access and store information maintained on a mass storage device 206, such information including client rules 206a, valuation data 206b, client application software 206c, inspection report generation 206d, an image or photo database 206e, inspection report and other data 206f, and other information. In the exemplary illustrative non-limiting implementation, processor 202 executes client application software 206c (typically but not necessarily under control of an operation system not shown) to perform the various functions described below.

As shown in FIG. 2A a digital or other camera 208 may be used to capture images of inspection items for storage into image database 206e. A printer 210 may be used to print hard copies of inspection reports and other data 206f. Other peripheral devices including webcams, audio and sound cards, projection capabilities, laser or other scanners, or any other type of peripheral could be used.

Example 'Flat Car' Part Picking Method

The exemplary illustrative non-limiting system is designed to be easy to use by vehicle inspection experts. Vehicle inspection experts are not necessarily also computer experts, so the system is intended to be easy to learn and use by non-technical users.

Figure 1G:
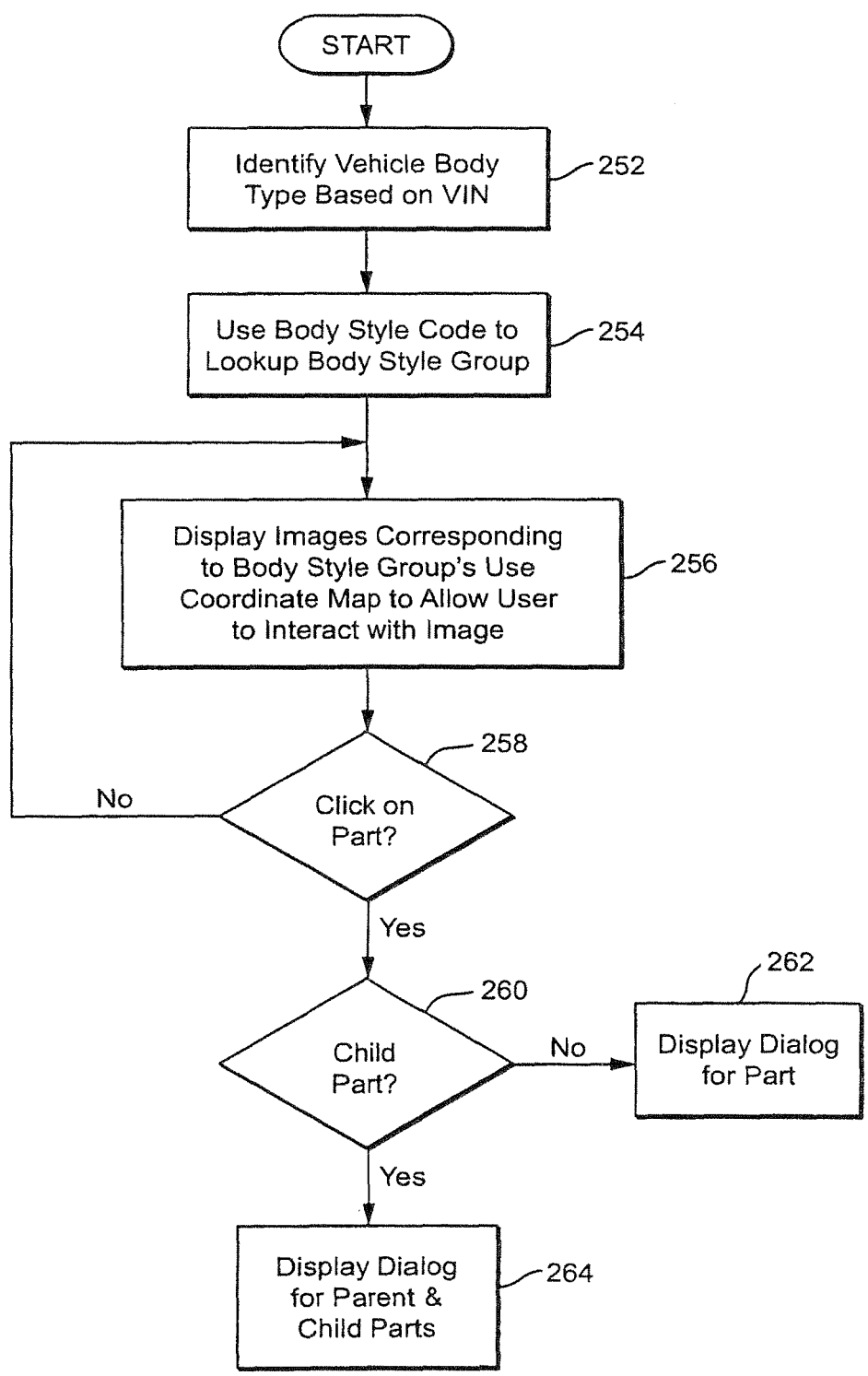
FIG. 1G is a flowchart of an example body style group classification process.
Figure 1H:
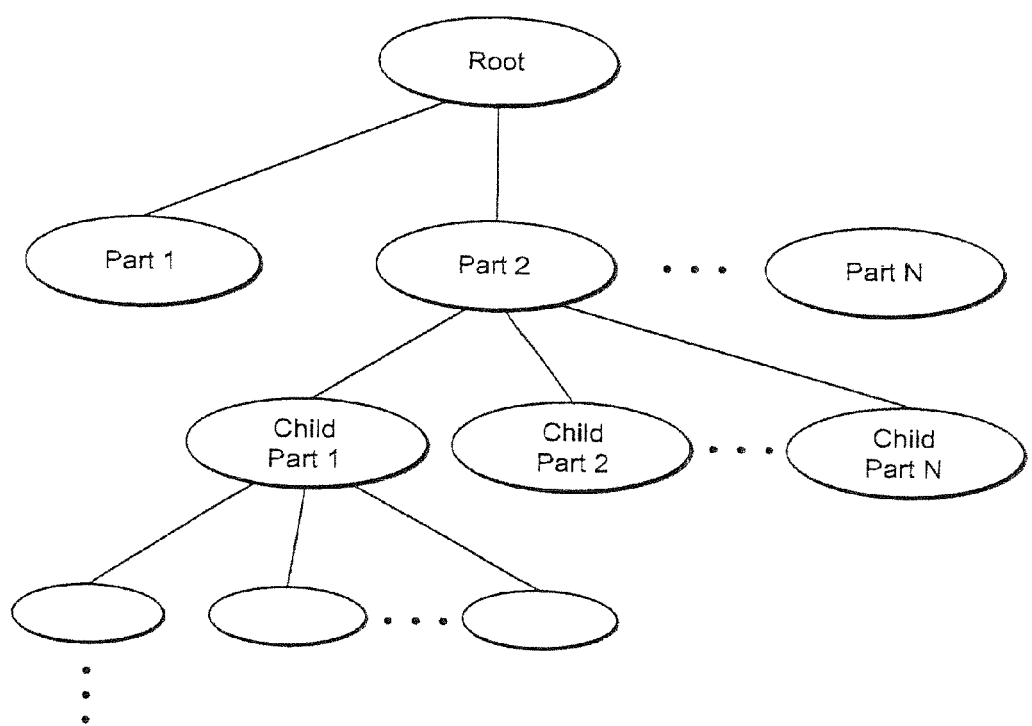
FIG. 1H is a schematic illustration of an example illustrative non-limiting hierarchical parts data organization.

Ease of use is provided through the use of 'flat car' part picker technology shown in FIGS. 1G and 1H. When an inspector wishes to note that a particular vehicle part is damaged (FIG. 1B block 82), his/her (hereafter, simply 'his') first task is to pick the proper part in the inspection system that corresponds to the part on the vehicle that is damaged.

The first step in the algorithm is the identification of the vehicle's body type. This is accomplished through the use of decoding the VIN inputted at FIG. 1B block 78. In the exemplary illustrative non-limiting implementation, the first eleven characters of a VIN utilize an encoding scheme that can be decoded to provide information about the vehicle. One attribute that can be decoded in this way is the body style code of the vehicle. The appliance client application 206c database assigns all of the possible VIN character combinations to one of 53 body style codes (such VIN decoding techniques are well-known industry practice) (FIG. 1G block 252).

The exemplary illustrative non-limiting implementation then programmatically assigns the body style code to a body style group (block 254). Many of the 53 body style codes typically used are very similar; often they differ only trivially or aesthetically. By assigning each body style code to a body style group, we can decrease the number of vehicle interfaces that need to be developed by programmers and learned by inspectors. For example, the codes 'SUV' (Sport Utility Vehicle'), 'MPV' (Multi-Purpose Vehicle), '4SUV' (4-Door Sport Utility Vehicle), and '4MPV' (4-Door Multi-Purpose Vehicle) all represent essentially the same type of automobile from the standpoint of inspector 50. Thus, all of those body styles may be grouped under the same body style group.

Figure 3A:
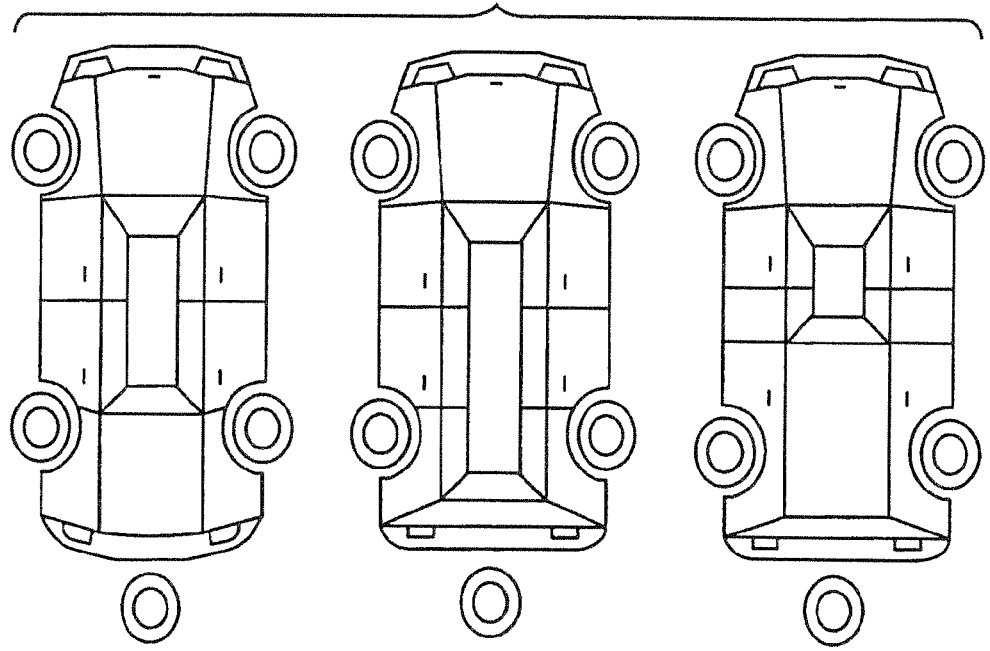
FIG. 3A shows example illustrative non-limiting stylized, top-down, 'flattened' views of vehicle body style groups.
Figure 3B:
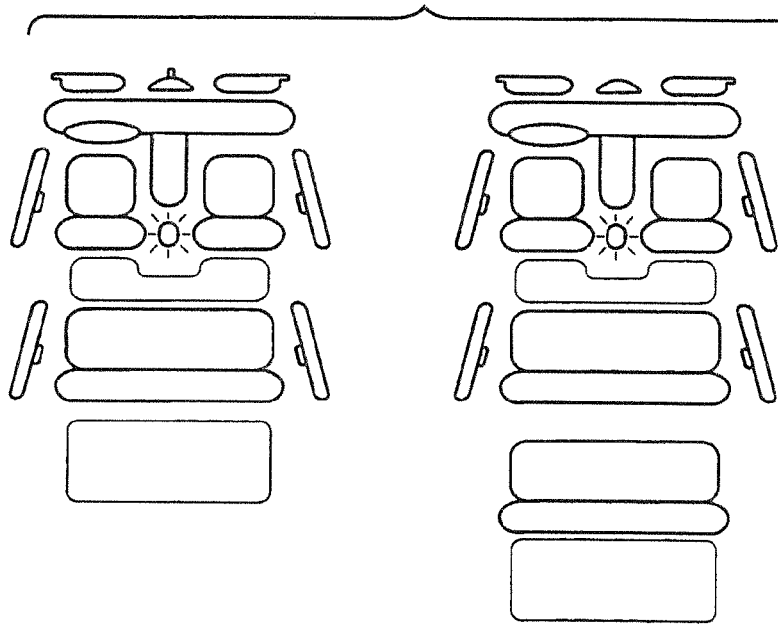
FIG. 3B shows example illustrative non-limiting images portraying interior views of different vehicle types.

Next, each body style group is assigned to a GIF or other format image that portrays a stylized, top-down, 'flattened' view of that type of vehicle (block 256). For example, FIGS. 3A-3C portray 4-door sedans, SUV's, and pickup trucks, respectively. For each body style group, there is an image that portrays the interior of that type of vehicle as well (see FIG. 3B). Note the difference between the stylized sedan interior, left, and the SUV interior, right, which typically includes a third-row seat.

For each of the images used to portray a vehicle interior or exterior, a coordinate map is provided that defines each of the polygons in the image and what vehicle part that polygon represents (block 256). For example, FIG. 3C shows an exemplary coordinate map for a four-door sedan exterior image.

Figures 4, 5:
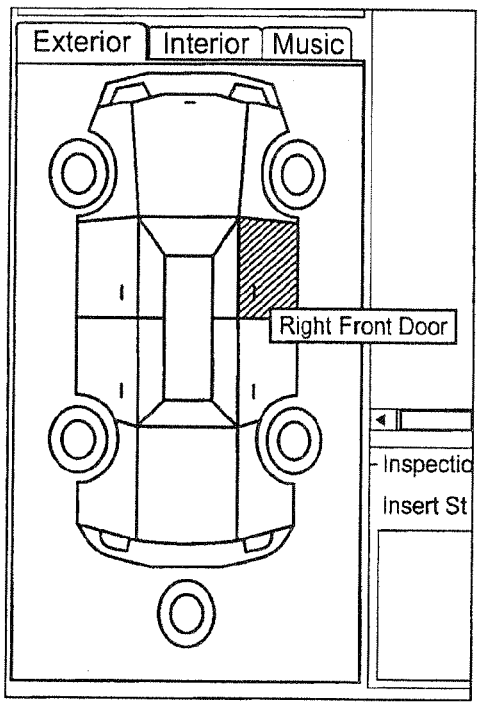
FIG. 4 shows an exemplary illustrative non-limiting use of a coordinate map to show the user hovering over the right front door area on the four-door sedan image.
FIG. 5 shows an exemplary illustrative non-limiting implementation of a displayed dialog window that allows the inspector to enter a damage record for either portions of a hierarchical set of parts.

The exemplary illustrative non-limiting system then displays the proper image for the vehicle's body style in the computer-driven user interface, highlighting each polygon defined in the coordinate map as the computer mouse passes over each coordinate region (block 256). This highlighting gives the user immediate feedback as to which part he would select if he clicked the mouse or used the stylus to select a particular part (block 258). FIG. 4 shows the user hovering over the right front door area on the four-door sedan image.

When the user clicks the highlighted part, that indicates that he wishes to enter a damage for that part. However, the damage to a right front door, for example, might not be to the door panel itself, but rather to the door handle, door hinge, door molding, etc. If all of those subsidiary parts were displayed in the flattened car image, the image would become over-detailed and crowded, and we would lose much of our ease-of-use benefit.

Therefore, each part in the exemplary illustrative non-limiting part database 206h is flagged as either a "parent" part (i.e., one that is actually portrayed in the flattened car images), or a "child" part (one that is too detailed to be portrayed in the flattened car images). See FIG. 1H for an exemplary schematic hierarchical view of such an exemplary database. Each child part is assigned to the proper parent part. When the inspector clicks on a part, a dialog window is displayed on the computer that allows the inspector to enter a damage record for either the clicked parent part or one of the child parts of that parent (see blocks 260, 262, 264).

This process combines technologies and techniques in a novel way that will provide unprecedented ease of use for non-computer expert inspectors. This method also prevents inspectors from accidentally entering damages on parts that would make no sense in the context of a given vehicle style. For example, the inspector cannot accidentally input a damage record for a pickup tailgate while inspecting a four-door sedan.

Example Client-Customizable Inspection Criteria

An illustrative exemplary non-limiting implementation supports the distinctly different needs of multiple clients, but at the same time remains easy for inspectors to learn and use. To this end, an illustrative exemplary non-limiting implementation is designed to be highly customizable to differing client needs, but in ways that are intuitive and even transparent to the inspector. The goal is for the inspector to do his job in the same way for every client, but for the end inspection product to meet the distinct needs of the customer.

One example of this client customizability is the area of inspection criteria. Each client may have particular standards and decision-making processes that they want their inspectors to follow when performing inspections on their vehicles. These standards address issues such as how damages are reported and categorized, whether the damage should be considered normal or excess wear and tear, and whether or not the corrective action for the damage should be chargeable to the vehicle lessee.

For example, one client may state that any burn marks on seat upholstery greater than ¼" should be chargeable to the lessee as excess wear and tear. Another client may state that any burn hole is chargeable, but if the burn is just a mark and does not go through the upholstery, it is only chargeable if it is bigger than ½". Yet another client might state that all burn marks or holes over ½" are excess wear and tear and thus chargeable, but that surface singe marks that only affect the upholstery nap are only chargeable if over 1".

When one considers that each part on a vehicle will have inspection criteria such as this, and that those criteria will vary for each client, the number of criteria permutations becomes staggering. Sometimes in the past, each inspector had to apply these criteria by memory or by continual reference to the customer's criteria documents. This led to inconsistent and low-quality inspection reports by all but the most experienced inspectors.

An illustrative exemplary non-limiting implementation includes a database and software algorithms capable of storing and enforcing customer criteria programmatically. Using these tools, new trainee inspectors can produce inspections that meet the client's criteria as closely as inspections performed by users with years or experience.

A database is provided on appliance 50 in connection with a rules engine 206g in which each record represents a combination of part, damage, severity, action, and (optionally) special condition that are valid for a given client, as illustrated in FIG. 6.

The integration of this data into the software system is illustrated in FIGS. 7, 8, 9, 10 and 11. First the inspector uses the flat car interface to select the damaged part as described above, in this case, the windshield (see FIG. 7). When the user clicks the mouse in the highlighted windshield area, the damage entry dialog box appears (see FIG. 8). The user then selects the large button labeled "Damage" (see FIG. 8). The list of damages allowed for a windshield is displayed (See FIG. 9). The user then selects the correct damage type, and then clicks the large button labeled "Severity" (see FIG. 10). The list of severities that are permissible for the part/damage combination is displayed (see FIG. 11). The user then selects the correct severity. If there were multiple corrective actions that would be allowed for part/damage/severity combination, then that list would be displayed. However, in this case there is only one allowable action, so the "Action" field is automatically filled with the only choice (see FIG. 11). Note that each of these various options is fully customizable on a client-by-client and/or inspection type basis to provide different criteria for different inspection clients, inspection types and other factors.

This illustrative non-limiting exemplary approach provides several advantageous features including the following:
- The user can be prevented from selecting combinations of parts and damages that do not make sense, "Rusty Windshield" for example.
- The user can be restricted to list only those damages that interest the client.
- The user can be restricted to pick only repair actions that have been approved for use by the client.
- The user can be focused to be concerned with severities that identify threshold levels as defined by the client.
- The user does not have to memorize complicated rules for determining whether damages are chargeable.

Client-Customizable Pricing

The exemplary illustrative non-limiting system herein supports completely client-customizable part repair and replacement pricing. The pricing system works in close conjunction with the inspection criteria system described above. Each criteria plan endpoint (i.e., each combination or part, damage, severity, and action) can be assigned a specific combination of repair, refinish, and parts installation hours or fixed costs. The combination can also specify part replacement costs, if applicable.

Figure 12A:
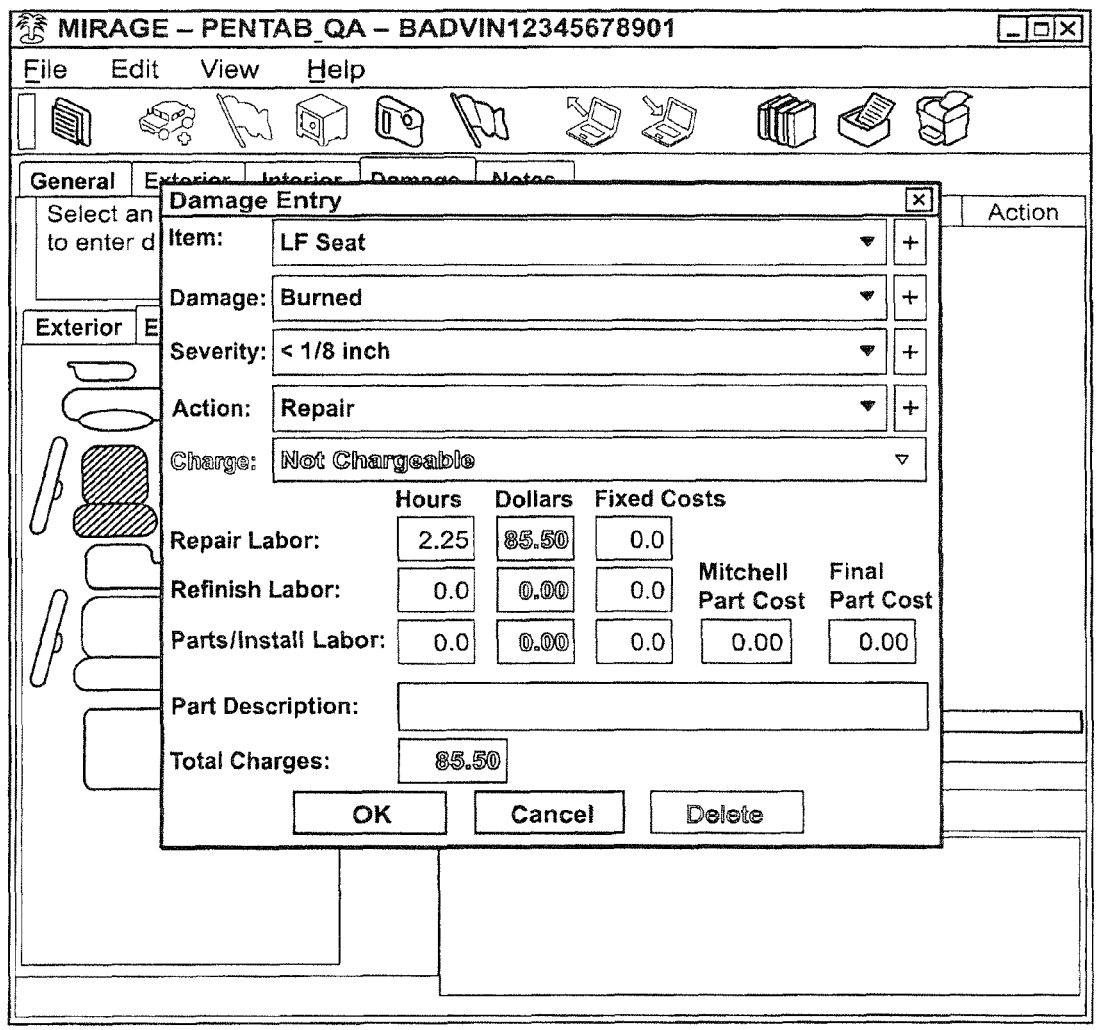
FIGS. 12A-12E are exemplary illustrative non-limiting damage entry screens.

For example, in the FIG. 12A illustrative non-limiting example, the user has clicked on the left front seat area of the flat car damage picker. The damage entry dialog has appeared, and he has chosen the "Burned" damage, "<⅛ inch" severity, and the "Repair" action. For that combination of choices, the illustrative exemplary non-limiting implementation system has accessed the pricing database 206b and determined that the correct pricing is 2.25 hours of repair labor, at $38.00 per hour, for a total of $85.50:

The exemplary illustrative non-limiting system has also determined that this repair is not chargeable to the vehicle lessee, since burn holes under ⅛ inch are considered normal wear and tear by this lessor. A different client would have different chargeability and pricing rules.

Figure 12B:
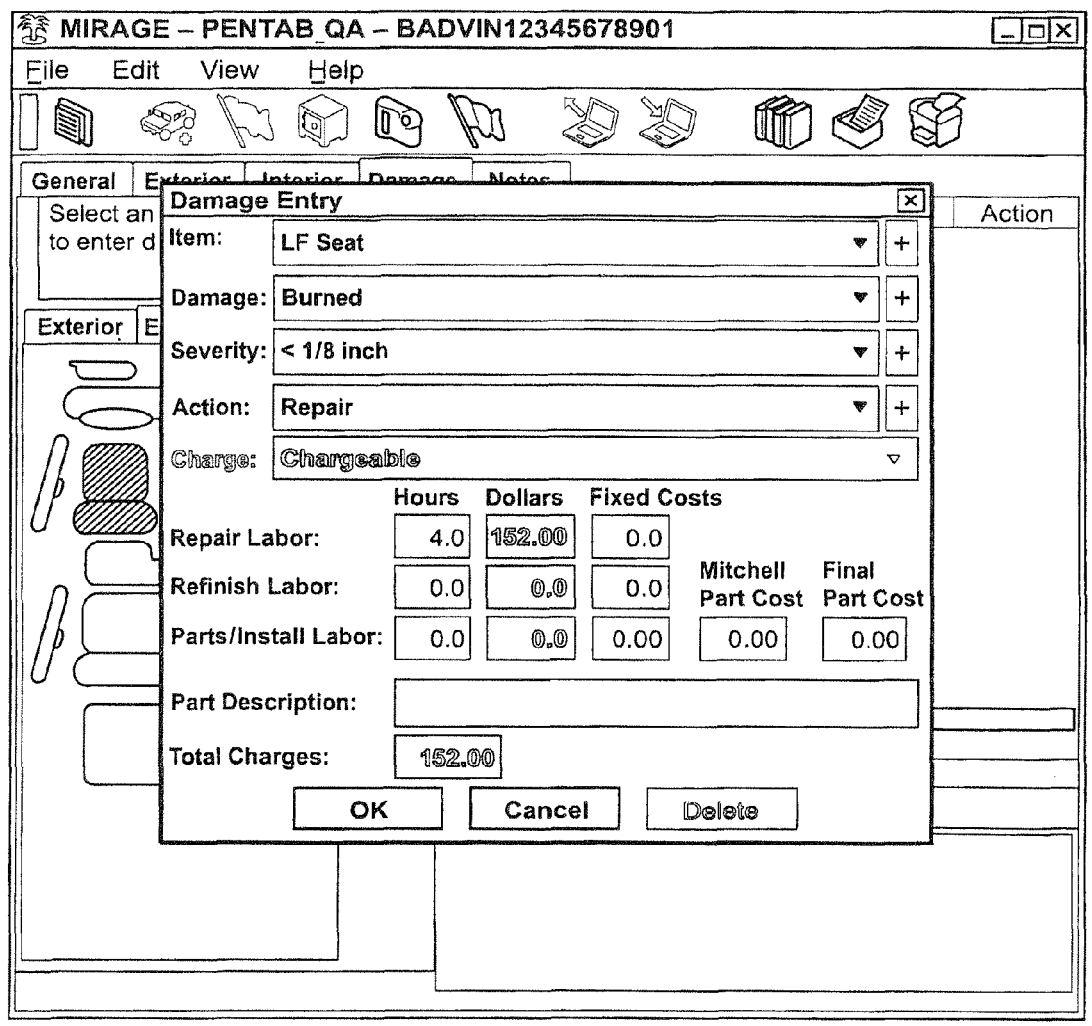

In the FIG. 12B exemplary illustrative non-limiting example, the user has chosen the same part, damage, and action, but the severity in this case is ">⅛ inch". That difference has resulted in the damage being considered as excess wear and tear, thus chargeable to the lessee. The pricing has also been increased to 4.0 hours, resulting in a total charge of $152.00.

The labor rates can be defined per client and will be applied to each damage calculation similarly. However, if necessary, the labor rates can be overridden for each criteria endpoint. For example, one particular client might have a default refinish labor rate of $40.00 per hour, but they might specify that refinish labor on interior wood dashboards should be charged at $50.00 per hour.

Figure 12C:
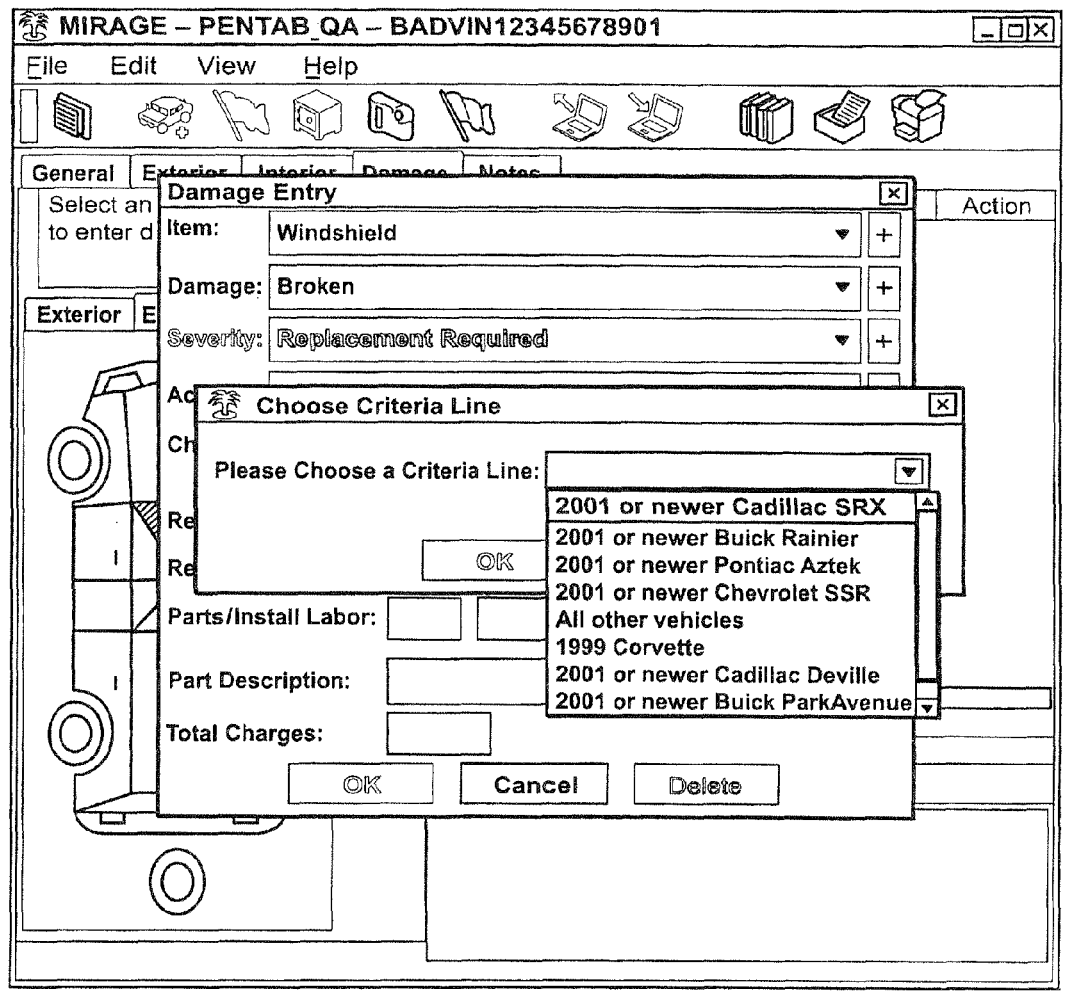

Each criteria plan endpoint can also be further sub-divided by a detailed comment list, with each choice in the list having its own pricing. In the FIG. 12C, the user has clicked on the windshield area of the flat car damage picker. The damage entry dialog has appeared, and he has chosen the "Broken" damage. In the case of a broken windshield, the only allowable severity is "Replacement Required" and the only allowable action is "Replace", so those options have been chosen automatically. However, this particular client, GMAC, has defined different pricing levels for broken windshields based on the model of the car being inspected (see FIG. 12C)

Figure 12D:
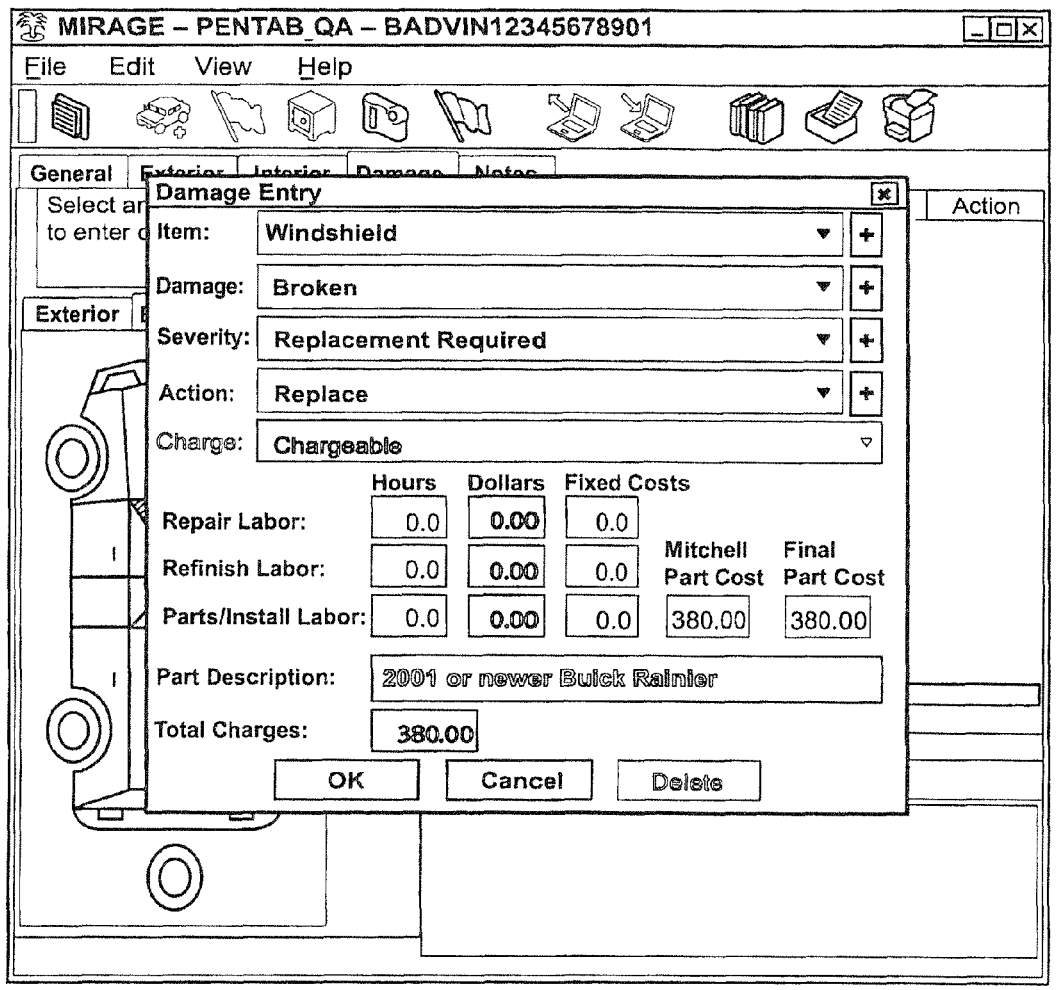

The user continues by selecting the "2001 or newer Buick Rainier" comment line. That choice results in a windshield replacement cost of $380.00 (see FIG. 12D).

Figure 12E:
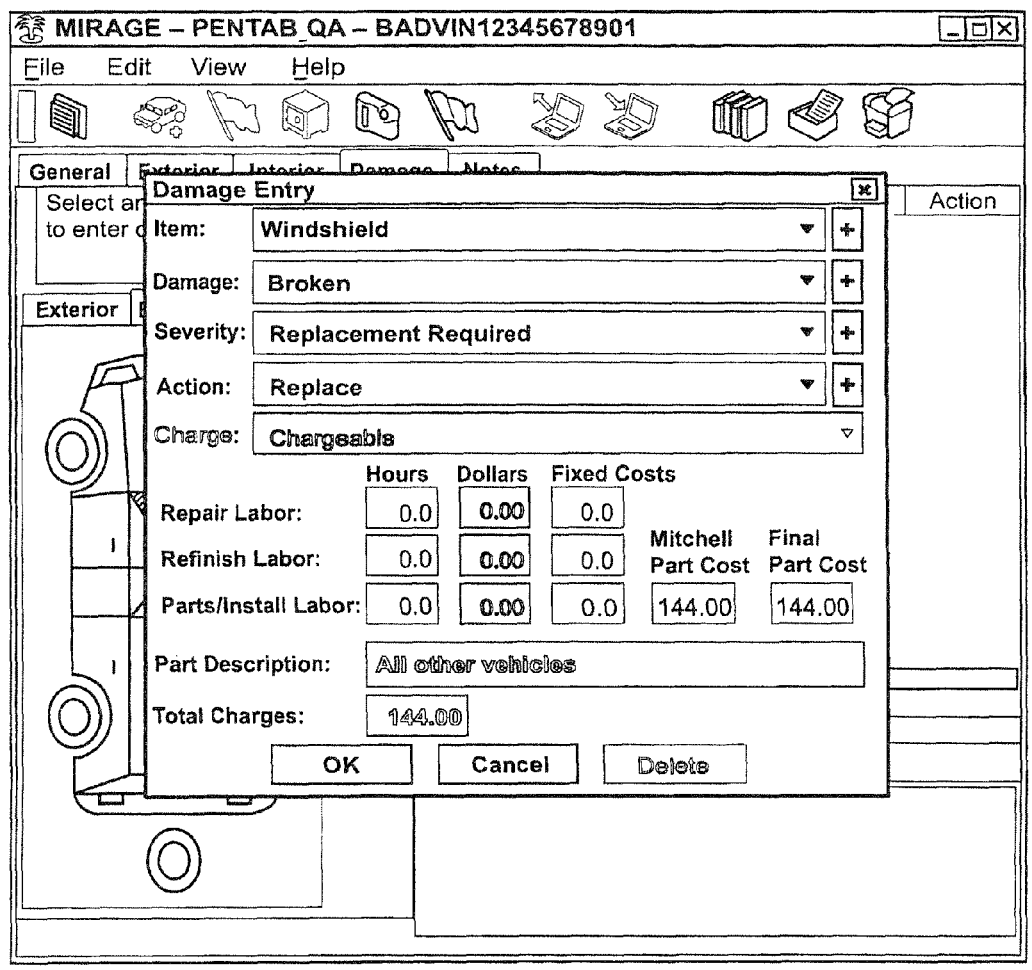

If the user had instead picked "All other vehicles", for example, the windshield replacement pricing would have been set at $144.00 (see FIG. 12E).

Other uses of the pricing subdivision include pricing the replacement of standard vs. powered antenna masts, providing different refinish rates for normal vs. metallic flake paint, or allowing different body shop repair time estimates for body panels dented on a curved edge rather than the flat part of the panel.

This integrated pricing structure means that the inspector 50 does not have to memorize complicated pricing schemes or constantly refer to printed pricing manuals. This provides an enormous productivity advantage over competing inspection systems.

Example Client-Customizable Rules-Based Validation

There may be aspects to completing a vehicle inspection other than listing damaged parts. Information such as the type of audio system, dashboard type, roof type, and airbag can be entered. Whether or not options such as power steering, power brakes, or intermittent wipers are equipped or not equipped must be noted. Digital images may be taken of various angles of the car and damaged parts.

Each client may have different rules for how vehicle attributes are reported, which options are of interest, and which images are required. An illustrative exemplary non-limiting implementation supports this variety of inspection needs by providing a rules-based validation engine that is used to verify the conformance of an inspection to client needs before it is marked as completed.

When the inspector believes he has completed an inspection, he clicks the "Complete Inspection" button on the an illustrative exemplary non-limiting implementation system toolbar (FIG. 1B, block 86). An illustrative exemplary non-limiting implementation then validates the inspection data against the set of rules that are chosen for that particular client. If any validation rule has been violated, the FIG. 13A exemplary window is displayed with the list of missed rules.

Figure 13A:
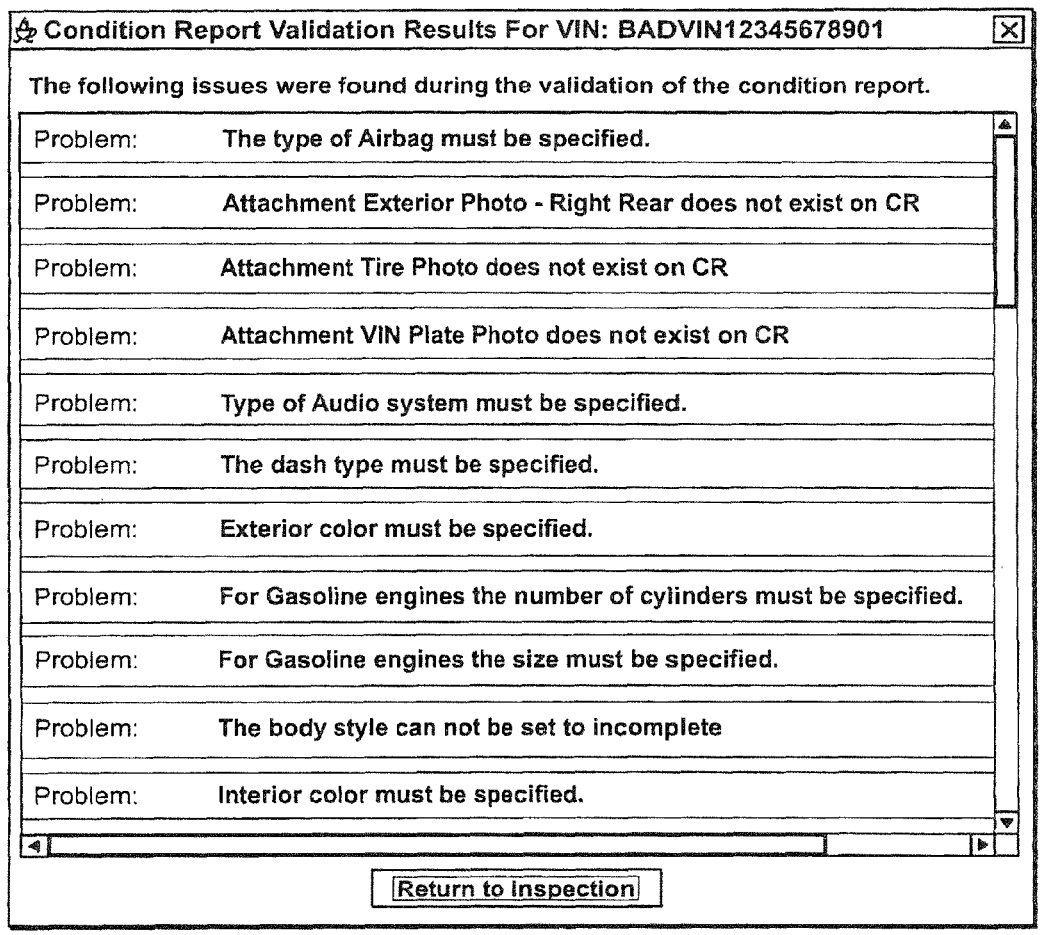

Typically, an inspector will not violate this many rules. For purposes of illustration, FIG. 13A shows a scenario where the inspector has intentionally violated a number of rules to illustrate the wide variety of rule types.

After the inspector has viewed the list of validation errors, he will click the "Return to Inspection" button and correct the errors. He will then try completing the inspection again, and the data will be revalidated, and the validation results window will be redisplayed if necessary.

Some rules may be set to allow overrides. For example, if a client states that they prefer to receive trunk photos with an inspection, but will accept an inspection without them if they are not applicable, then the Trunk Photo rule could be set to allow overrides. In that case, the inspector could elect to enter an override reason in lieu of fixing the problem when that rule is encountered, as shown in the FIG. 13B.

The assignment of validation rules to particular clients is defined in the database, which means that if a client decides to start enforcing a given validation rule, that rule can be assigned to them in the database and received automatically in the next database replication sent to the inspector's PC, rather than requiring a software update or patch.

Example Client-Customizable Automatic Grading

Many clients request that their vehicles be assigned a grade at the close of each inspection (see FIG. 1B, block 89). The grade is determined by a detailed algorithm that usually assigns a preliminary grade based on the total damage to the vehicle, and then assigns a final grade based on specific questions about the car.

Figure 13C:

Each client can have a different algorithm and set of questions for determining a vehicle grade. The exemplary illustrative non-limiting system supports various clients' grading schemes through the use of a grading window that calculates the damage amount and asks questions specific to the needs of the client. The FIG. 13C example shows the grading window for GMAC vehicles.

At the top of the window, the preliminary damage calculation is shown. GMAC bases their preliminary grade on the total of the chargeable damages to the vehicle, excluding damage to glass parts (windshield, etc.) and tires. Other clients will use different damage totaling rules.

Next is a series of questions that will change the calculated preliminary grade if applicable. The questions are sorted by their level of impact, with the most serious issues asked first. That way, once one question is answered, the final grade is assigned, and the remaining questions may be skipped.

Figure 13D:

For example, in the FIG. 13D example, the inspector has indicated that the mileage of the vehicle can not be determined, probably due to odometer damage. The final grade is immediately set to "Other" (this client's term for "Poor") and the remaining questions can be skipped.

This automated grading functionality greatly increases the consistency and accuracy of grade assignments over manual grade calculations.

While the technology herein has been described in connection with exemplary illustrative non-limiting implementations, the invention is not to be limited by the disclosure. For example, while the exemplary illustrative non-limiting example described herein focuses on used motor vehicles, many other applications and uses are possible and contemplated. The invention is intended to be defined by the claims and to cover all corresponding and equivalent arrangements whether or not specifically disclosed herein.

I claim:

1. A handheld mobile computer system for performing item inspections comprising:
a handheld housing dimensioned so that an inspector can move the housing about and within a vehicle;
a processor disposed in said handheld housing;
a touch screen disposed on said handheld housing, the touch screen coupled to said processor, said touch screen including a display and a touch-sensitive surface, said touch-sensitive surface being structured to provide input signals in response to a user touching indications displayed on said display;
a wireless communications device disposed in said handheld housing and coupled to said processor, said wireless communications device allowing a user touching said touch-sensitive surface to communicate inspection results with computing devices external of said housing;
a camera coupled to the processor, said camera being structured to acquire images of portions of the vehicle the camera is pointed at; and
a memory coupled to said processor, said memory storing instructions that, when executed by said processor, control said processor to:
present a user interface at least in part via said touch screen;
receive input of inspection data into said handheld computer device via the touch sensitive surface at least in part in response to said presented user interface, the inspection data including (a) selection of damaged areas of a vehicle, and (b) severity of damage based at least in part on pre-stored quantitative size of damage of selected damaged areas; and
automatically ascertain a grade value for grading condition the vehicle based at least in part on the inspection data, the processor automatically determining the grade value based at least on (a) calculated total damage to the vehicle, and (b) answers to specific questions displayed on the touch screen and prompting responses relating to at least (1) vehicle body or frame defects, (2) vehicle powertrain condition, (3) vehicle tire condition, (4) vehicle accessory condition, and (5) vehicle interior condition;
the processor wirelessly reporting the grade value and/or the components thereof via the wireless communications device.

2. The system of claim 1 wherein said memory stores further instruction performing an automatic valuation based on said inputted inspection data.

3. The system of claim 1 wherein said memory stores further instructions that validate said inputted inspection data.

* * * * *